(12) United States Patent
Kohashi et al.

(10) Patent No.: US 6,728,883 B1
(45) Date of Patent: Apr. 27, 2004

(54) ADDITIONAL INFORMATION SUPERIMPOSING APPARATUS, ADDITIONAL INFORMATION SUPERIMPOSING METHOD, ADDITIONAL INFORMATION DETECTING APPARATUS, AND ADDITIONAL INFORMATION DETECTING METHOD

(75) Inventors: Takashi Kohashi, Tokyo (JP); Nozomu Ikeda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/510,439

(22) Filed: Feb. 21, 2000

(30) Foreign Application Priority Data

Feb. 22, 1999 (JP) .......................................... 11-043382

(51) Int. Cl.$^7$ ................................................ G06F 11/30
(52) U.S. Cl. ...................... 713/200; 713/165; 713/168; 713/201
(58) Field of Search ................................ 713/200, 165, 713/168, 201

(56) References Cited

U.S. PATENT DOCUMENTS 5,469,370 A * 11/1995 Ostrover et al. ............ 711/111

* cited by examiner

Primary Examiner—Thomas R. Peeso
(74) Attorney, Agent, or Firm—Frommer Lawrence & Haug LLP; William S. Frommer

(57) ABSTRACT

The invention relates to an apparatus for superimposing additional information on information signals. This apparatus comprises a particular-pattern generator for generating plural particular patterns corresponding to additional information; a rotation block rotating, in a predetermined order, the sequence in which the plural particular patterns are arranged and outputting the sequentially rotated patterns; a phase inverting block for inverting the phases of the plural particular patterns for every period and outputting the phase-inverted particular patterns; and a superimposing block for superimposing each of the plural sequence-rotated and phase-inverted particular patterns on an information signal in a predetermined unit. The novel constitution enhances the secrecy of the additional information and the performance of its detection.

26 Claims, 13 Drawing Sheets

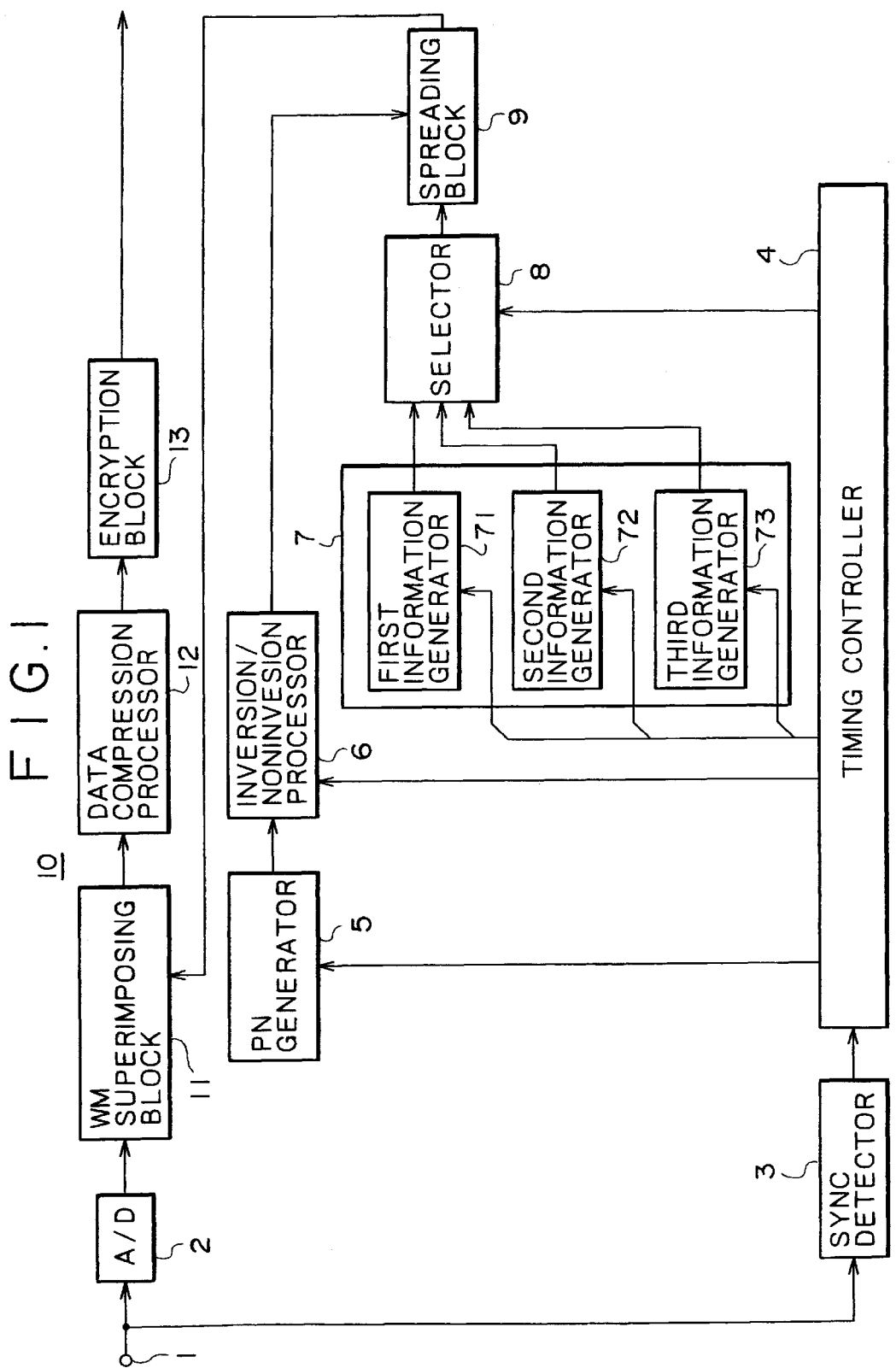

ADDITIONAL INFORMATION SPECTRUM BEFORE SPREADING

ADDITIONAL INFORMATION SPECTRUM AFTER SPREADING

SPECTRUM OF INFORMATION SIGNAL SUPERIMPOSED WITH SS ADDITIONAL INFORMATION

SIGNAL SPECTRUM AFTER REVERSE SPREADING

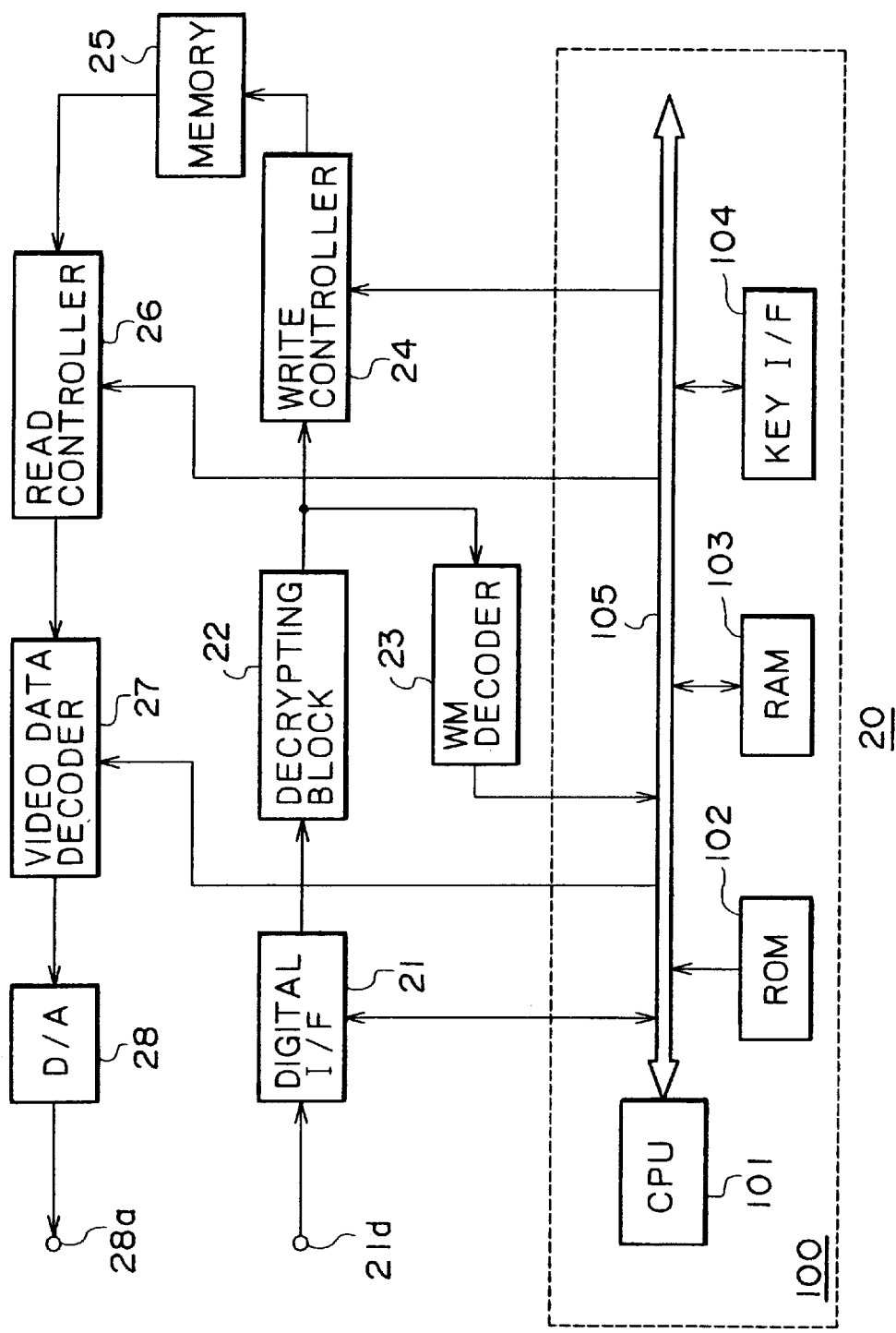

ADDITIONAL INFORMATION SUPERIMPOSING APPARATUS, ADDITIONAL INFORMATION SUPERIMPOSING METHOD, ADDITIONAL INFORMATION DETECTING APPARATUS, AND ADDITIONAL INFORMATION DETECTING METHOD

BACKGROUND OF THE INVENTION

The present invention relates generally to an additional information superimposing method, an additional information detecting method, an additional information superimposing apparatus, and an additional information detecting apparatus for superimposing additional information such as duplication control information and copyright information for example onto an image signal and detecting the superimposed additional information from this image signal as required.

With the recent proliferation of digital content such as the Internet, CDs (Compact Discs), and DVDs (Digital Versatile Discs), copyright violations of digital content due to its unauthorized duplication have been problems. To deal with these problems, several schemes have been proposed in which additional information for duplication control is superimposed on digital content by means of electronic watermarking for example to prevent unauthorized duplication and limit the use of the digital content thus duplicated.

In electronic watermarking, information is embedded as noise into portions of an image or audio signal which are not essential in human recognition, or portions which are not redundant to music and video. The information thus embedded in an image or audio signal is hardly removed therefrom. On the other hand, even after an image or audio signal embedded with electronic watermark is filtered or compressed, the embedded watermark can be detected from this signal.

A duplication control scheme based on electronic watermarking provides, depending upon the additional information to be embedded as watermark, the following four conditions to represent the duplication generations and duplication control states of video or audio signals embedded with watermark information superimposed:

(1) copy free;
(2) copy once;
(3) no more copy; and
(4) never copy.

(1) "Copy free" denotes that an audio or image signal concerned can be duplicated freely. (2) "Copy once" denotes that an audio or image signal concerned can be duplicated only once. (3) "No more copy" denotes that the duplication made under the condition (2) "Copy once" is prohibited for further duplication. (4) "Never copy" denotes that an audio or image signal is prohibited at all.

Thus, electronic watermark information indicative of a duplication generation or a duplication control state is embedded in an image or audio signal. When this signal is copied by the user into another storage medium, the embedded watermark information in the signal is detected. According to the duplication generation and duplication control state included in the detected watermark information, the signal is controlled in recording or reproduction, thereby surely preventing the unauthorized duplication of content such as image and audio signals.

In superimposing multiple-bit additional information onto a digital image signal for example as electronic watermark information, each electronic watermark information corresponding to each bit of the additional information is superimposed in a predetermined superimposition area of each frame, for example, of the digital image signal. However, if such superimposition areas are arranged sequentially and fixedly along time axis, the additional information superimposed on the image signal as electronic watermark information would be easily falsified or otherwise tampered.

To be more specific, if it is clear which bit of the additional information is superimposed at which position of each frame of the image signal, the electronic watermark information may be easily falsified for unauthorized duplication.

Sometimes, in addition to the above-mentioned duplication control information, a digital image signal is superimposed with an APS (Analog Protection System) information for preventing the duplication of an analog image signal if this digital image signal is converted into it and additional data such as copyright information for example as electronic watermark information.

Thus, when plural pieces of additional information are superimposed as electronic watermark information onto an image signal, arrangement of superimposition areas fixedly along time axis also makes it easily known which additional information is superimposed in which location of the image signal. This would make it easy to falsify the duplication control information and APS information for the unauthorized duplication of image signals.

SUMMARY OF THE INVENTION

It is therefore an object of the present invention to provide an additional information superimposing apparatus for superimposing additional information onto an information signal, comprising: a particular-pattern generating means for generating a plurality of particular patterns corresponding to the additional information; a rotating means for rotating, in a predetermined order, a sequence in which the plurality of particular patterns are arranged and outputting the sequentially rotated particular patterns; a phase inverting means for inverting the phases of the plurality of particular patterns for every predetermined period and outputting the phase-inverted particular patterns; and a superimposing means for superimposing each of the sequentially rotated and phase-inverted particular patterns onto each of predetermined units of the information signal.

BRIEF DESCRIPTION OF THE DRAWINGS

These and other objects of the invention will be seen by reference to the description, taken in connection with the accompanying drawing, in which:

FIG. 1 is a block diagram illustrating an output device of a first embodiment to which the invention is applied;

FIG. 5 is a block diagram illustrating a recording/reproducing device of the first embodiment;

DETAILED DESCRIPTION OF PREFERRED EMBODIMENTS

Figure 2A:
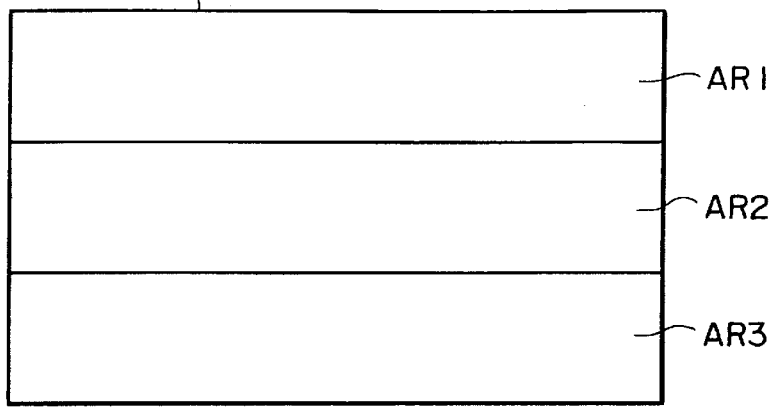
FIG. 2A depicts an area in which additional information is superimposed on an image signal in the output device shown in FIG. 1.

The following describes preferred embodiments of an additional information superimposing method, an additional information superimposing apparatus, an additional information detecting method, and an additional information detecting apparatus according to the present invention with reference to the accompanying drawings.

In the following embodiments of the invention, the additional information superimposing method and the additional information superimposing apparatus will be described by use of examples in which the invention is applied to image signal output devices for use in a so-called authoring system for creating recording media such as a DVD on which image signals for example are recorded, a broadcasting system for broadcasting image signals for example through broadcasting media, and a personal computer capable of sending and receiving image signals for example through a network such as the Internet.

In the following embodiments of the invention, the additional information detecting method and the additional information detecting apparatus will be described as applied to a recording/reproducing device for image signals as processed by a personal computer for example which receives image signals through a network such as the Internet and duplicates the received image signals on recording media such as a magnetic disc, an optical disc, a magneto-optical disc, and a semiconductor memory.

It should be understood that, in the following embodiments, the image signal output device and the image signal recording/reproducing device each can also process audio signals other than image signals. However, for the purpose of simplicity, the descriptions of signal processing systems other than an image signal processing system will be omitted herein.

First Embodiment
[Image Signal Output Device]

Referring to FIG. 1, there is shown a block diagram illustrating an image signal output device (hereafter simply referred to as an output device) 10 of the first embodiment of the invention for use in an authoring system, a broadcasting system, and a personal computer for example.

As shown in FIG. 1, the output device 10 comprises an analog image signal input terminal 1, an A/D (Analog-to-Digital) converter 2, a sync detector 3, a timing controller 4, a PN (Pseudo-random Noise) generator 5, an inversion/noninversion processor 6, an additional information generator 7, a selector 8, a spreading block 9, an electronic watermark information superimposing block (hereafter referred to as a WM superimposing block) 11, a data compression processor 12, and an encryption block 13.

The additional information generator 7 has a first information generator 71, a second information generator 72, and a third information generator 73. These generators each generate different additional information to be superimposed on an image signal.

To be more specific, in the first embodiment, the first information generator 71 in the additional information generator 7 generates duplication control information. The duplication control information indicates the duplication control state of an image signal on which this information is superimposed. As described before, this state is one of the following four states: (1) "Copy free," (2) "Copy once," (3) "No more copy," and "Never copy."

In the first embodiment, each of these four states is represented by two bits; "Copy free"="00", "Copy once"="01", "No more copy"="10" and "Never copy"="11" for example.

The second information generator 72 in the additional information generator 7 generates APS information. The APS information is used to control the insertion of a pseudo sync pulse for AGC (Automatic Gain Control) into an analog image signal and control inversion of a color stripe burst signal. In this embodiment, the APS information is represented by two bits.

When a digital image signal superimposed with these pieces of additional information is converted into an analog image signal according to this APS information or a combination of the duplication control information and the APS information, control of turning on/off the insertion of the AGC sync pulse into the analog image signal and control of inverting a color stripe burst signal are executed.

Then, if the duplication-prohibited digital image signal is converted into an analog image signal and this analog image signal is duplicated for reproduction, no normal reproduced image can be obtained due to the AGC control pseudo sync pulse and the color stripe inversion burst signal, thereby making the protected image signal unavailable by duplication.

The third information generator 73 in the additional information generator 7 generates additional data. The additional data provide information such as copyright information for example which is superimposed on image signals upon request by a copyright holder. In the first embodiment, this information is represented by four bits.

The output device 10 of the first embodiment superimposes each of these pieces of additional information generated by the additional information generator 7 onto an image signal as particular patterns. In this embodiment, a particular pattern denotes electronic watermark information that, when superimposed on an image signal, does not deteriorate the resultant image signal, is robust against elimination and falsification, and is ready for detection from the image signal as required.

In the first embodiment, a particular pattern represented by the electronic watermark information is a spread spectrum signal formed by spectrum-spreading the additional information by use of a PN (Pseudorandom Noise) code. Therefore, as shown in FIG. 1, the output device 10 has a PN generator 5 for generating a PN code and a spreading block 9 for spectrum-spreading the additional information by use of the PN code.

Figure 2B:
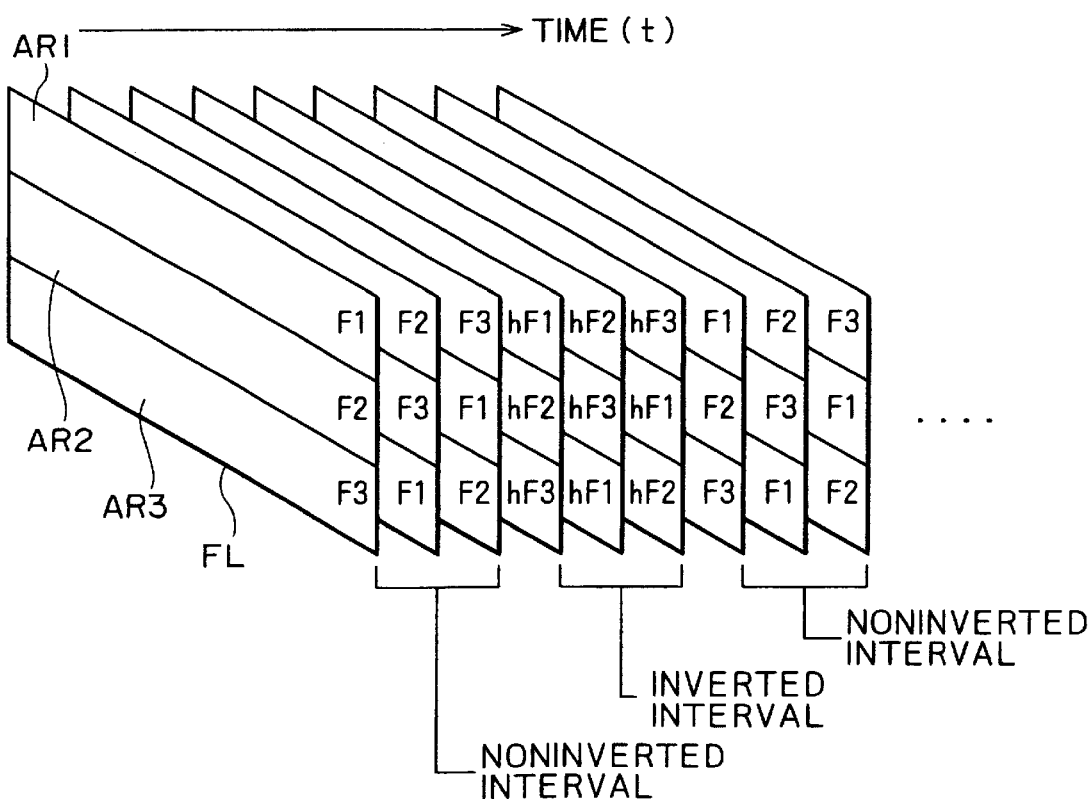
FIG. 2B depicts how the additional information to be superimposed on the additional information superimposition area of the image signal is rotated and phase-inverted in the output device shown in FIG. 1.

Further, the output device 10 superimposes the duplication control information, the APS information, and the additional data, which comprise the electronic watermark information, onto each of the frames of an image signal. Referring to FIGS. 2A and 2B depict the superimposition of the additional information, which comprises plural pieces of electronic watermark information, onto an image signal.

As shown in FIG. 2A, in the output device 10, each frame of an image signal is equally divided into three areas AR1, AR2, and AR3 onto which the additional information are superimposed in the horizontal direction. The duplication control information, the APS information, and the additional data of the additional information as electronic watermark information are superimposed on these areas one to one.

However, as described before, if these pieces of additional information are superimposed always at the same positions in each frame, there may occur problems in the secrecy and reliability of the additional information. For example, if the duplication control information is always superimposed onto a certain area of each frame, it would be easy for users to extract only the duplication control information and analyze it for falsification, thereby allowing the image signal easily processed in an unauthorized manner.

To avoid these problems, the output device 10 rotates, in a predetermined order, a sequence in which the plural pieces of additional information as electronic watermark information are arranged for superimposition onto each image signal. Thus, the superimposed positions of these pieces of additional information becomes different from frame to frame of the image signal, thereby making additional information kept secret.

To be more specific, let duplication control information be F1, APS information be F2, and additional data be F3. Then, as shown in FIG. 2B, a first frame from which additional information superimposition starts, is superimposed with duplication control information F1 onto partial area AR1, APS information F2 onto partial area AR2, and additional data F3 onto partial area AR3.

In the next frame, APS information F2 is superimposed onto partial area AR1, additional data F3 onto partial area AR2, and duplication control information F1 onto partial area AR3. In the frame next to this frame, additional data F3 are superimposed onto partial area AR1, duplication control information F1 onto partial area AR2, and APS information F2 onto partial area AR3.

Thus, the sequence in which the three pieces of additional information are arranged is rotated for superimposition onto the three partial superimposition areas AR1, AR2, and AR3 for each frame. In the output device 10 as shown in FIG. 2B, the three pieces of additional information make one rotation on a three-frame basis, namely in units of three frames. To implement this rotation, a selector switch 8 to be described later is provided.

In addition, the output device 10 inverts the phases of the three pieces of additional information as electronic watermark information for every rotation, namely for every set of three frames of an image signal on which the these pieces of additional information are superimposed.

To be more specific, as shown in FIG. 2B, in the first three frames, duplication control information F1, APS information F2, and additional data F3 are rotated in sequence for superimposition. In the next three frames, these pieces of additional information are not only rotated but also inverted in phase.

Therefore, as shown in FIG. 2B, in the fourth frame from the beginning, partial area AR1 is superimposed with inverted duplication control information hF1 obtained by inverting the phase of duplication control information F1, partial area AR2 with inverted APS information hF2 obtained by inverting the phase of APS information F2, and partial area AR3 with inverted additional data hF3 obtained by inverting the phase of additional data F3.

In the fifth frame, partial area AR1 is superimposed with inverted APS information hF2, partial area AR2 with inverted additional data hF3, and partial area AR3 with inverted duplication control information hF1. In the sixth frame, partial area AR1 is superimposed with inverted additional data hF3, partial area AR2 with inverted duplication control information hF1, and partial area AR3 with inverted APS information hF2.

Then, as shown in FIG. 2B, in the seventh, eighth, and ninth frames, the phases of the three pieces of additional information as electronic watermark information are restored to their initial states and the three pieces of additional information are only rotated for superimposition like the case the first frame to the third frame are superimposed to start superimposition of the additional information. Thus, the output device 10 inverts and restores the phases of the three pieces of additional information (electronic watermark information) on a three-frame basis for superimposition onto the image signal.

This arrangement allows, at detection of the additional information as electronic watermark information, cancellation of the image signal component of the image signal on which the additional information is superimposed, thereby quickly and correctly detecting the superimposed additional information as electronic watermark information, which will also be described later.

In this first embodiment, the phase of PN code for use in spread spectrum is controlled to control the phase of the additional information to be superimposed on an image signal as electronic watermark information. Therefore, the output device 10 has an inversion/noninversion processor 6 for inverting and restoring the phase of PN code.

Thus, in the output device 10 according to the first embodiment, when superimposing the three pieces of additional information, which are duplication control information, APS information, and additional data, onto an image signal as electronic watermark information, these pieces of information are rotated in sequence for each set of three frames of the image signal for superimposition thereon and their phases are inverted for every rotation, thereby enhancing the secrecy and security of the additional information.

Figure 3:
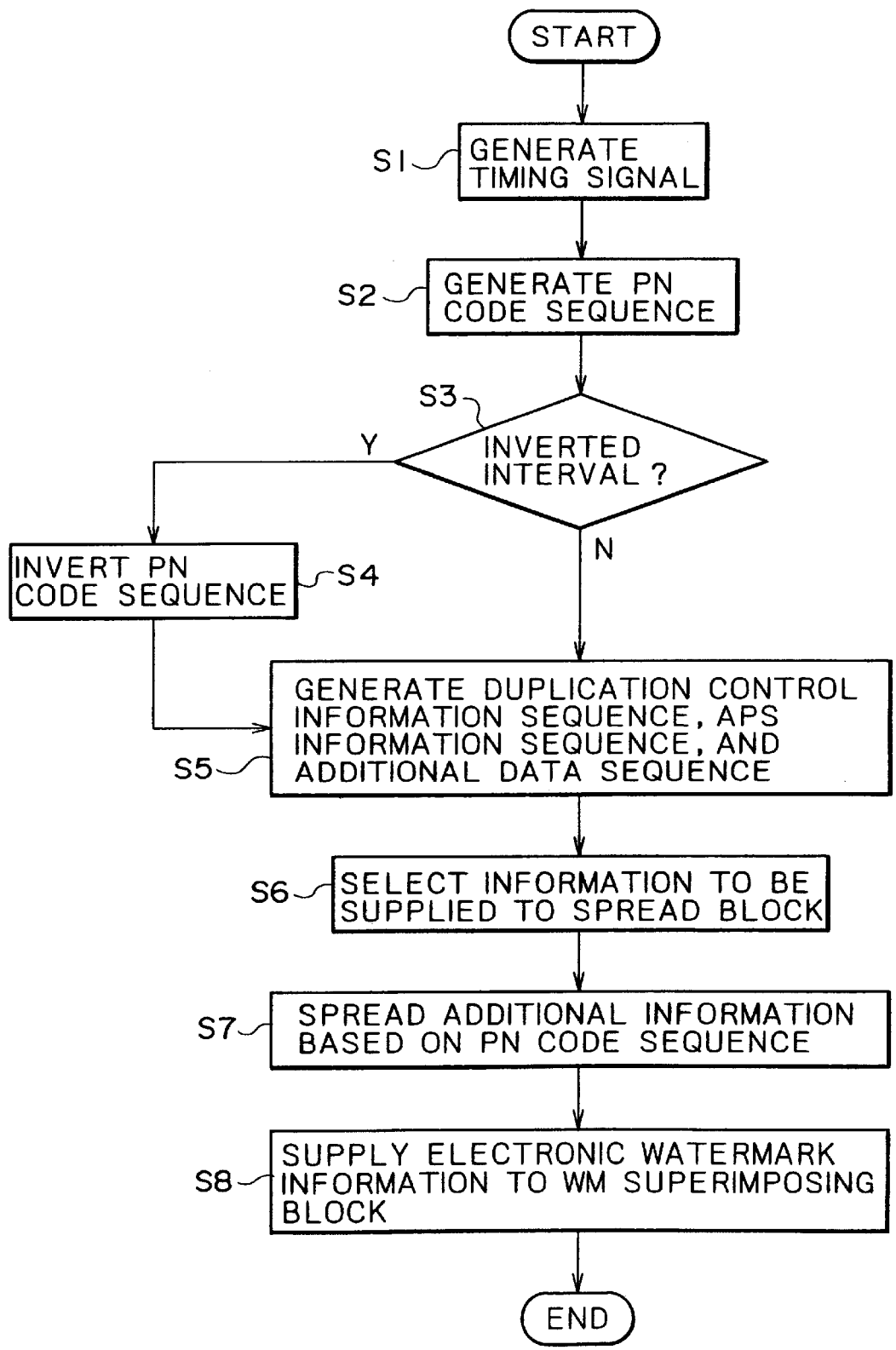
FIG. 3 is a flowchart describing a control operation by a timing controller of the output device shown in FIG. 1.

The following describes in detail the operation of the output device 10 with reference to a flowchart shown in FIG. 3 indicative of a control operation by the timing controller 4. In the output device 10 shown in FIG. 1, an analog audio signal inputted at an analog audio signal input terminal 1 is supplied to an A/D converter 2 and a sync detector 3. The A/D converter 2 converts the inputted analog image signal into a digital signal and supplies it to the WM superimposing block 11.

The sync detector 3 detects a vertical synchronous signal V and a horizontal synchronous signal H from the inputted analog image signal and supplies them to a timing controller 4. In step S1, the timing controller 4 uses the vertical synchronous signal V and the horizontal synchronous signal H as reference signals to generate timing signals for use in the PN generator 5, the inversion/noninversion processor 6, the additional information generator 7, and the selector switch 8 and supply the generated timing signals thereto.

To be more specific, in the output device 10, the timing controller 4 generates a PN reset signal PRE for generating a PN code series having a predetermined code pattern from its beginning, an additional information reset signal FRE for generating a duplication control information series, an APS information series, and an additional data series from their beginnings, and a clock signal CLK for generating each of a PN code series, a duplication control information series, an APS information series, and an additional data series in unit of one chip.

The PN reset signal PRE and the clock signal CLK are supplied to the PN generator 5. The additional information reset signal FRE and the clock signal CLK are supplied to each of information generators 71, 72, and 73 in the additional information generator 7.

In the output device 10, the PN reset signal PRE is a signal having one frame period for generating a PN code series having a predetermined code pattern from its beginning.

The additional information reset signal FRE is a signal having a period equivalent to plural horizontal lines constituting the partial areas AR1, AR2, and AR3 for generating each of a duplication control information series, an APS information series, and an additional data series from their beginnings in each of the partial areas AR1, AR2, and AR3 of each frame FL.

The clock signal CLK supplied to the PN generator 5 and the information generators 71, 72, and 73 in the additional information generator 7 is a signal of one pixel period for generating one chip of each of a PN code, duplication control information, APS information, and additional data for each pixel of the image signal for example.

In addition, the timing controller 4 generates an inversion control signal HT for controlling the inversion/restoration of the phase of each PN code and supplies the generated inversion control signal HT to the inversion/noninversion processor 6. At the same time, the timing controller 4 generates a switching control signal CT for controlling the selector switch 8 for switching between the three pieces of additional information to be spectrum-spread and superimposed onto the image signal.

In the first embodiment, the inversion control signal HT is a signal have a three-frame period. This is because, as described with reference to FIG. 2B, it is necessary to invert the phase of the additional information to be superimposed onto the image signal in every period in which the sequence of the three components of the additional information to be superimposed on the image signal as electronic watermark information is rotated, namely, in every set of three frames of the image signal.

The switching control signal CT switches between the three pieces of additional information to be supplied to a spreading block 9 for each of the partial areas AR1, AR2, and AR3 in each frame FL of the image signal. Like the additional information reset signal FRE, the switching control signal CT has a period equivalent to plural horizontal lines constituting the partial areas AR1, AR2, and AR3.

In step S2, receiving the PN reset signal PRE and the clock signal CLK from the timing controller 4, the PN generator 5 generates a PN code series having a predetermined pattern for every frame. In this case, by considering that the resultant digital image signal is compressed by MPEG format and outputted from the output device 10, the PN generator 5 generates the same PN code for every sub block in which DCT (Discrete Cosine Transform) processing is executed at data compression.

Thus, spectrum-spreading the additional information by use of the same PN code for every sub block (or DCT block) for superimposition on the image signal beforehand allows quick and correct detection of the superimposed additional information from the compressed image signal without decompressing it by compression decoding processing. It should be noted that, in the first embodiment, one frame provides one processing unit, so that the size of each sub block is the number of horizontal pixels×the number of vertical pixels=8 pixels×16 pixels.

The PN code series is supplied from the PN generator 5 to the inversion/noninversion processor 6. In step S3, on the basis of the inversion control signal HT supplied from the timing controller 4, the inversion/noninversion processor 6 determines whether a set of three consecutive frames falls within an interval in which the phase of the PN code series is to be inverted. If the decision is yes, then, in step S4, the inversion/noninversion processor 6 inverts the phase of the PN code series. If the decision is no, then, in step S5, the inversion/noninversion processor 6 outputs the PN code series without change to the spreading block 9.

In step S5, the first information generator 71, the second information generator 72, and the third information generator 73, in the additional information generator 7, generate, on the basis of the additional information reset signal FRE and the clock signal CLK supplied from the timing controller 4, a duplication control information series, an APS information series, and an additional data series respectively in the partial areas AR1, AR2, and AR3 of each frame of the image signal. The generated series are supplied to the selector switch 8.

In the output device 10, the information generators 71, 72, and 73 are instructed beforehand by the user through a key operation block and a key controller, not shown, for example what kind of duplication control information, APS information, and additional data are to be generated.

According to the instructed duplication control information, the first information generator 71, like the above-mentioned PN generator 5, generates a duplication control information series such that the same duplication control information series is assigned to same sub blocks and supplies the generated series to the selector switch 8. Likewise, the second information generator 72 generates an APS information series such that the same APS information is assigned to same sub blocks and supplies the generated APS information series to the selector switch 8. The third information generator 73 generates an additional data series such that the same additional data are assigned to same sub blocks and supplies the generated additional data series to the selector switch 8.

As described before, in the first embodiment, duplication control information and APS information are additional information each represented by two bits and additional data are information represented by four bits. Consequently, duplication control information, APS information, and additional data are different from each other in the number of sub blocks to which one bit of information is assigned.

In step S6, on the basis of the switching control signal CT supplied from the timing controller 4, the selector switch 8 switches one of the duplication control information series, the APS information series, and the additional data series supplied from the additional information generator 7 to the spreading block 9. In the output device 10, as described with reference to FIG. 2B, the three pieces of additional information are superimposed as electronic watermark information onto the partial areas AR1, AR2, and AR3 of each frame one to one in a rotated manner.

For this purpose, the selector switch 8 operates, on the basis of the switching control signal CT, such that (1) the duplication control information series, (2) the APS information series, and (3) the additional data series are superimposed in this order onto the partial areas AR1, AR2, and AR3 in this order of the first frame from which the superimposition starts.

For the second frame, the selector switch 8 outputs the additional information such that (1) the APS information series, (2) the additional data series, and (3) the duplication control information series are superimposed in this order onto the partial areas AR1, AR2, and AR3 in this order of the second frame. Thus, the selector switch 8 rotates the three pieces of additional information so that they are superimposed on the different partial areas every time they are superimposed on each of the frames of the image signal. The rotated pieces of additional information are supplied to the spreading block 9.

In step S7, the spreading block 9 spectrum-spreads, on the basis of the PN code series supplied from the inversion/noninversion processor 6, each piece of additional information supplied from the selector switch 8 to form electronic watermark information (a spread spectrum signal) to be superimposed on the image signal. In step S8, the electronic watermark information is supplied to the WM superimposing block 11. As described before, the inversion/noninversion processor 6 outputs a PN code series of which phase is inverted on a three-frame basis which is an interval for one rotation of the three kinds of additional information. Consequently, the spreading block 9 generates the electronic watermark information corresponding to the three kinds of additional information of which phases are inverted on a three-frame basis and supplies the generated electronic watermark information to the WM superimposing block 11.

The WM superimposing block 11 superimposes the additional information supplied from the spreading block 9 onto the digital image signal. As described before with reference to FIG. 2A, the spreading block 9 supplies the electronic watermark information in which the three kinds of additional information are rotated in sequence for superimposition on the partial areas AR1, AR2, and AR3 of every frame and the phases of these rotated pieces of additional information are inverted on a three-frame basis. The WM superimposing block 11 superimposes this electronic watermark information, namely the three kinds of additional information, onto the partial areas AR1, AR2, and AR3 of each frame of the digital image signal.

The WM superimposing block 11 supplies the digital image signal superimposed with the three kinds of additional information for each frame to the data compression processor 12. The data compression processor 12 compresses the digital image signal according to MPEG scheme and supplies the compressed signal to the encryption block 13.

The encryption block 13 performs CSS (Content Scramble System) encryption for example on the supplied digital image signal and outputs the encrypted signal. The outputted signal is then transmitted through various media such as being recorded on a DVD for example, broadcast, or transmitted through a network such as the Internet.

As described before, the three kinds of additional information, namely duplication control information, APS information, and additional data, are superimposed on image signals as electronic watermark information, thereby making it difficult to eliminate or falsify the additional information. Thus, the output device 10 according to the first embodiment can securely and reliably provide the three kinds of additional information to be used properly along with the image signal on which they are superimposed.

Figure 4A:
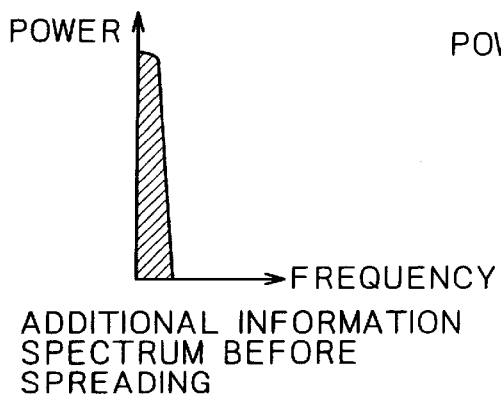
FIG. 4A depicts an additional information spectrum obtained before spectrum spread.
Figure 4B:
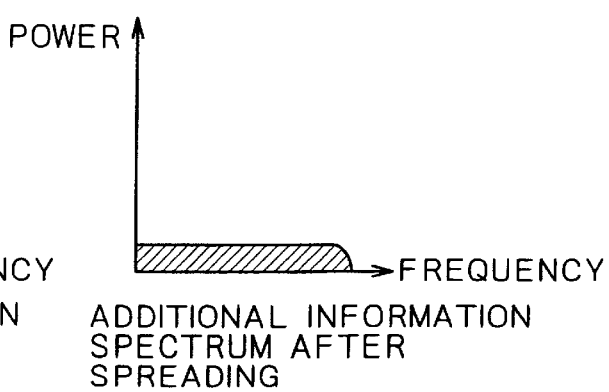
FIG. 4B depicts an additional information spectrum obtained after spectrum spread.

Referring to FIGS. 4A, 4B, 4C, and 4D, there are shown in spectra the relationships between the additional information such as duplication control information, APS information, and additional data to be superimposed on image signals as electronic watermark information and the information signal such as an image signal. The additional information including duplication control information is a low-bit-rate signal having a relatively small amount of information and a narrowband signal as shown in FIG. 4A. When this signal is spectrum-spread, a wideband signal as shown in FIG. 4B is obtained. At this moment, the power of the spread spectrum signal goes lower inversely with the band expansion ratio.

Figure 4C:
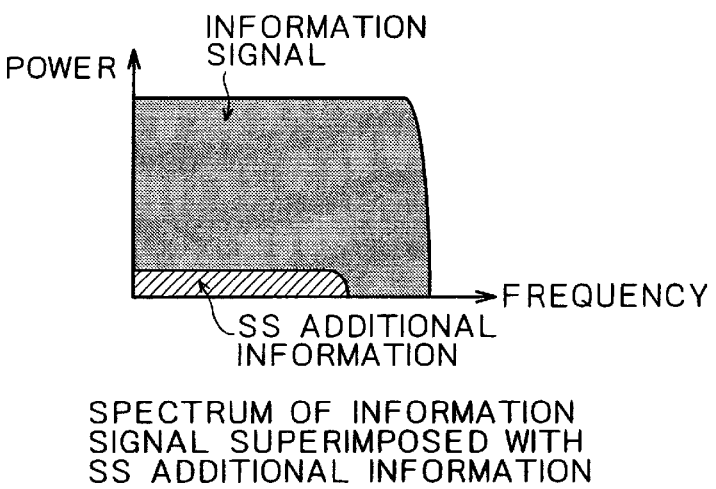
FIG. 4C is a spectrum diagram illustrating an information signal superimposed with spread spectrum information.

This spread spectrum signal, namely the electronic watermark information, is superimposed on the image signal by the WM superimposing block 11. In this case, as shown in FIG. 4C, the electronic watermark information is superimposed at a power lower than that in the frequency range of the image signal. Superimposition in this manner virtually prevents the information signal from being deteriorated. Therefore, as described, when the image signal superimposed with the electronic watermark information is supplied to a monitor receiver and reproduced, a good reproduced image is obtained with little adverse effect due to the electronic watermark information.

Figure 4D:
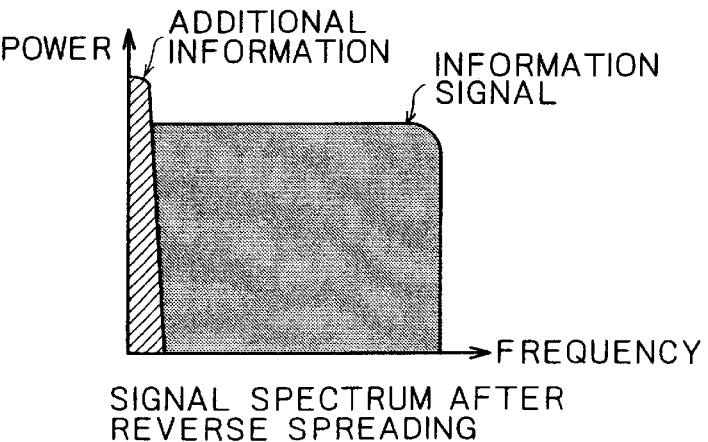
FIG. 4D is a spectrum diagram illustrating an information signal obtained after reverse spread spectrum.

On the other hand, as will be described, when the image signal is de-spread spectrum (namely, returned to its initial form) to detect the electronic watermark information, the same is restored again as the narrowband signal as shown in FIG. 4D. Giving a sufficiently large band expansion ratio raises the power of the de-spread additional information over that of the information signal, thereby allowing the detection.

In this case, the electronic watermark information is superimposed on the image signal in the same period and frequency as those of the image signal, thereby disabling the elimination and modification of the electronic watermark information by use of a frequency filter or a simple rewrite operation.

Thus, the superimposed electronic watermark information cannot be removed from the image signal and falsification of the watermark information is difficult, thereby surely preventing the image signal from unauthorized duplication by use of the duplication control information extracted from the image signal.

Furthermore, in the output device 10 of the first embodiment, the three kinds of additional information are not superimposed in the same sequence onto at least two adjacent frames of an image signal; namely, no same additional information is superimposed on the same partial areas of the adjacent frames. This arrangement makes it difficult to analyze only the duplication control information and determine its content for its falsification, thereby enhancing the secrecy and reliability of the additional information which is superimposed on image signals as electronic watermark information.

In addition, as will be described, at detection of the three kinds of additional information, subtraction is made between signal intervals each consisting of three consecutive frames, each signal interval being superimposed with the electronic watermark information having different phases, thereby canceling the image signal component. This arrangement allows correct and quick detection of only the additional information superimposed on the image signal as electronic watermark information.

Consequently, the present invention enhances the reliability and security of the entire system that processes the image signals superimposed with additional information as electronic watermark information.

[Image Signal Recording/Reproducing Device]

Now, referring to FIG. 5, there is shown an image signal recording/reproducing device 20 of the above-mentioned first embodiment (hereafter referred to simply as a recording/reproducing device). The recording/reproducing device 20 is a recording/reproducing device such as a personal computer for example in which an image signal outputted from the output device 10 shown in FIG. 1 and supplied through a network such as the Internet or a wireless network is received and copied into their memory devices.

As described with reference to FIGS. 2A and 2B, an image signal to be supplied to the recording/reproducing device 20 shown in FIG. 5 is superimposed on each frame of the image signal with the additional information including duplication control information, APS information, and additional data as electronic watermark information. These three kinds of additional information are rotated in sequence to be superimposed on the partial areas of each frame. In addition, the phases of the three kinds of additional information are inverted on a three-frame basis providing one interval in which the three kinds of additional information are fully rotated.

As shown in FIG. 5, the recording/reproducing device 20 comprises a digital image signal input terminal 21d, a digital interface (digital I/F) 21, a decryption block 22, a WM decoder 23, a write controller 24, a mass memory 25, a read controller 26, a video data decoder 27, a D/A converter 28, an analog image signal output terminal 28a, and a controller 100.

The controller 100 comprises a CPU 101, a ROM 102 storing necessary information including a program, a RAM 103 for use as a work area for example, and a key interface (key I/F) 104 for interfacing the information inputted by the user through a key operation block, not shown. These components are interconnected by a system bus 105. The controller 100 thus constituted controls the recording/reproducing device 20 according to the information inputted by the user for example.

The digital image signal supplied through a network is inputted in the digital I/F 21 through the input terminal 21d. The digital I/F 21 converts the supplied digital image signal into a signal that can be processed in the recording/reproducing device 20.

The digital image signal is then supplied from the digital I/F 21 to the decryption block 22. As described, the digital image signal supplied from the digital I/F 21 is compressed in MPEG format and encrypted. Therefore, the decryption block 22 executes decryption processing on the digital image signal (or a bit stream) and supplies the decrypted signal to the WM decoder 23 and the write controller 24.

Figure 6:
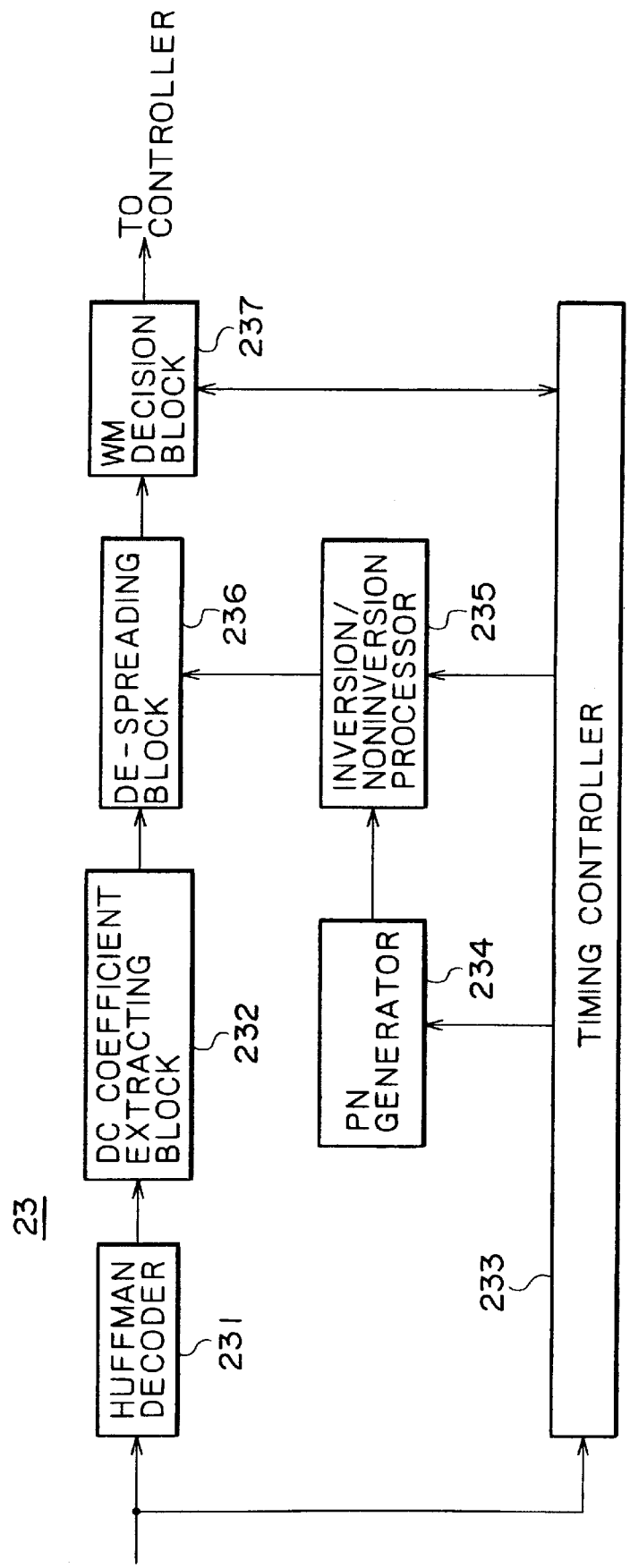
FIG. 6 is a block diagram illustrating an electronic watermark information decoder in the recording/reproducing device shown in FIG. 5.

The WM decoder 23 detects the additional information from the compressed digital image signal. Referring to FIG. 6, there is shown a block diagram of the WM decoder 23 of the recording/reproducing device 20 of the first embodimet.

As shown, the WM decoder 23 comprises a Huffman decoder 231, a DC coefficient extracting block 232, a timing controller 233, a PN generator 234, an inversion/noninversion processor 235, a de-spreading block 236, and a WM decision block 237.

The digital image signal outputted from the decryption block 22 is supplied to the Huffman decoder 231 and the timing controller 233. The Huffman decoder 231 decodes, in Huffman algorithm, the digital image signal compressed in MPEG format and supplies the decoded digital image signal to the DC coefficient extracting block 232. The DC coefficient extracting block 232 extracts a DC coefficient from each sub block, a processing unit of DCT (Discrete Cosine Transform) in each frame of the signal and supplies the extracted DC coefficient to the de-spreading block 236.

As described, in the first embodiment, the sub block which is a unit of discrete cosine transform processing and the unit block in which electronic watermark information is superimposed match each other in position and size. In the DC coefficient extracting block 232, the DC coefficient is extracted for each sub block for each frame.

Figure 7:
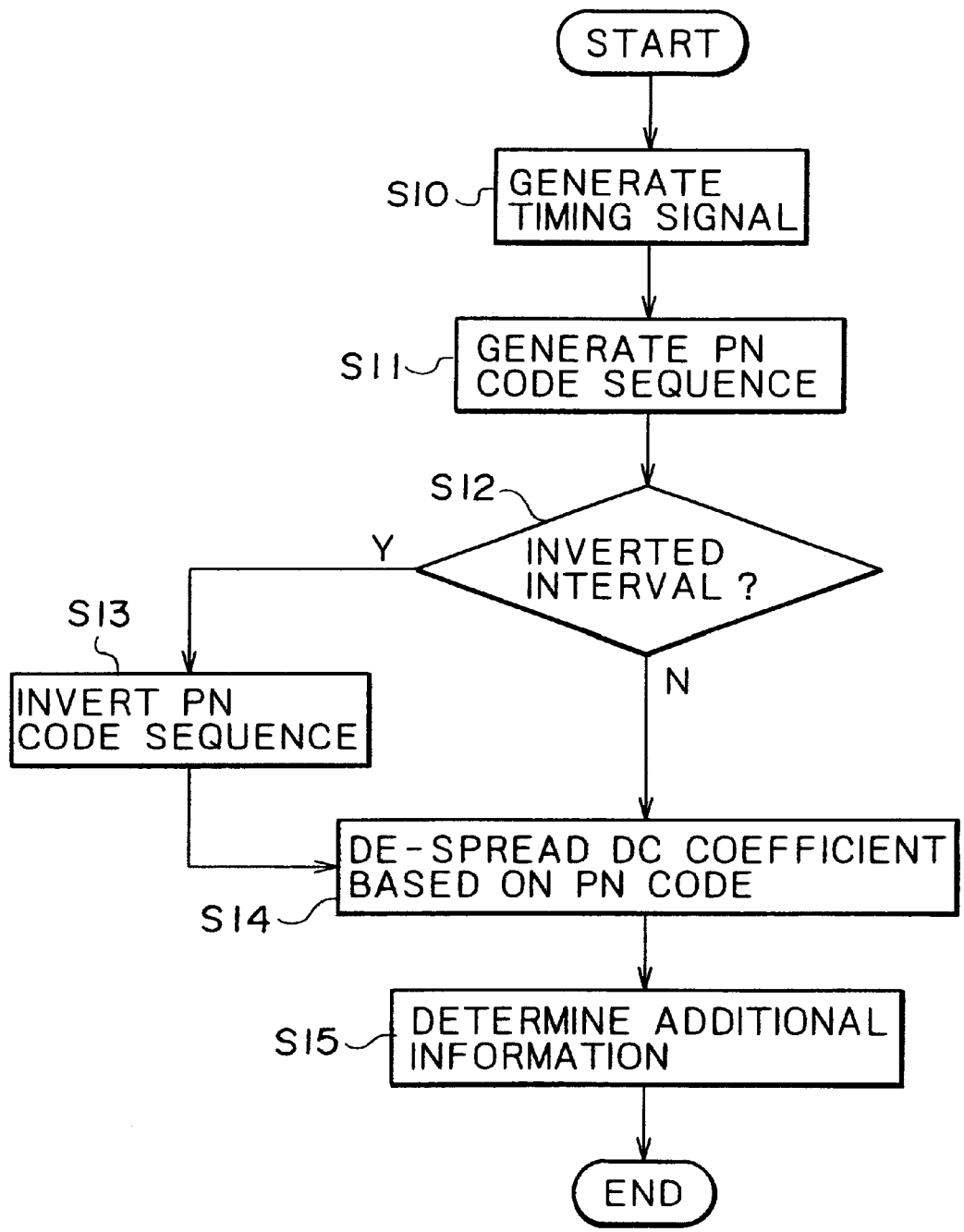
FIG. 7 is a flowchart describing a control operation by a timing controller of the electronic watermark information decoder.

The following describes control operations of the timing controller 233 of the WM decoder 23 with reference to the flowchart shown in FIG. 7. In the recording/reproducing device 20, the timing controller 233 generates, on the basis of a digital image signal, timing signals for use in the components of the WM decoder 23 and supplies the generated timing signals thereto in step S10.

To be more specific, in the recording/reproducing device 20, the timing controller 233 generates various timing signals such as a PN reset signal RE for generating a PN code series having a predetermined code pattern for each frame, a clock signal PNCLK for generating a PN code of one chip for each sub block of each frame, an inversion control signal HTS for controlling the inversion of the phase of the PN code in the inversion/noninversion processor 235, and a timing signal BBS indicative of the head of the three partial areas AR1, AR2, and AR3 superimposed with the additional information in each frame.

The inversion control signal HTS inverts the phase of the PN code supplied from the PN generator 234 on a three-frame basis which provides one period of the rotation in sequence of the three kinds of additional information superimposed on the image signal as electronic watermark information. This signal is a three-frame period signal. The timing signal BBS corresponds to the additional information reset signal FRE of the output device 10 and has a period equivalent to several sub blocks constituting the partial areas AR1, AR2, and AR3 of each frame.

The PN reset signal RE and the clock signal PNCLK are supplied to the PN generator 234 while the inversion control signal HTS and the clock signal PNCLK are supplied to the inversion/noninversion processor 235. The timing signal BBS and the clock signal PNCLK are supplied to the WM decision block 237.

In step S11, the PN generator 234 generates the same PN code series as that generated by the PN generator 5 of the output device 10. Then, based on the PN reset signal RE and the PN clock signal PNCLK, the PN generator 234 generates the same PN code series as that generated when the additional information superimposed on the image signal as electronic watermark information is spectrum-spread. Namely, when the additional information superimposed on the image signal is spectrum-spread, the PN generator 234 generates, for each sub block, the same PN code series as the PN code series assigned to each sub block of each frame.

On the basis of the inversion control signal HTS, the inversion/noninversion processor 235 inverts the phase of the PN code supplied from the PN generator 234 on a three-frame basis and outputs the PN code series phases of which are inverted. Namely, in step S12, the inversion/noninversion processor 235 determines whether a set of three consecutive frames falls within an interval in which the phase of the PN code is to be inverted. If the decision is yes, then, in step S13, the inversion/noninversion processor 235 inverts the phase of the PN code series. If the decision is no, the inversion/noninversion processor 235 outputs the PN code series without change to the de-spreading block 236 then the step goes on to step S14.

In step S14, the de-spreading block 236 de-spreads the DC coefficient of each sub block of each frame by use of the PN code series assigned to each sub block supplied from the inversion/noninversion processor 235 to extract the three pieces of additional information superimposed on the partial areas AR1, AR2, and AR3 of each frame of the digital image signal.

In the de-spreading block 236, de-spreading is executed by use of a phase-noninverted PN code series on a noninverted interval (consisting of three consecutive frames) superimposed with the additional information with its phase spectrum-spread by a phase-noninverted PN code series. De-spreading is executed by use of a phase-inverted PN code series on an inverted interval (consisting of three consecutive frames) superimposed with the phase-inverted additional information.

Thus, in the phase-inverted interval, de-spreading is executed by use of a phase-inverted PN code series. Therefore, the additional information superimposed with its phase inverted on the image signal is inverted in its phase again and detected as the additional information having a positive value as with the additional information with its phase not inverted. The image signal component in the phase-inverted interval is phase-inverted and takes a negative value.

Consequently, in the recording/reproducing device 20, the image signal components of the adjacent noninverted interval and inverted internal cancel each other in the de-spreading block 236. On the other hand, the phase-inverted additional information is phase-inverted again to become the additional information equivalent to the additional information of which phase is not inverted. Therefore, the additional information superimposed on the image signal as electronic watermark information can be extracted without failure.

Namely, the additional information can be extracted (or detected) such that the influence of the image signal on the additional information is minimized and, at the same time, the detection level of the additional information superimposed on the image signal as electronic watermark information is raised.

The output of the de-spreading block 236 is supplied to the WM decision block 237. In step S15, by use of the timing signal BBS and the clock signal PNCLK supplied from the timing controller 233 for reference, the WM decision block 237 determines, from the output of the de-spreading block 236, the additional information superimposed on the partial areas AR1, AR2, and AR3 of each frame. In the decision, by considering that the three kinds of additional information superimposed on the digital image signal as electronic watermark information are rotated in sequence in a predetermined order, the MW decision block 237 determines the contents of the electronic watermark information, that is, the duplication control information, APS information, and the additional data in the order of the rotation.

The WM decision block 237 sends the decision result to the controller 100. From this decision result, the controller 100 can recognize what kind of information are the duplication control information, APS information, and additional data superimposed on the digital image signal supplied to the recording/reproducing device 20 of the first embodiment through a network.

It should be understood that, in the recording/reproducing device 20, the detection of the additional information may not be started from the first frame on which the three kinds of additional information are superimposed in a rotated manner. Thus, if the frame at which the extraction of the additional information starts does not coincide with the frame at which the rotation starts, de-spreading cannot be executed by use of the PN code having the same series and phase as those at spectrum-spreading.

To overcome this problem, the WM decision block 237 is adapted to detect, according to the level of the output of the de-spreading block 236, whether the frame at which the detection of the additional information starts matches the frame at which the rotation starts. If these frames are found not matching, the WM decision block 237 sends a signal requesting to shift the frame at which the extraction of the additional information starts to the timing controller 233.

When this request signal comes, the timing controller 233 makes the timing signals advance or lag by one frame, thereby matching the frame at which the extraction of the additional information starts with the frame at which the rotation starts. Thus, the de-spreading block 236 can correctly extract the additional information.

In the recording/reproducing device 20 of the first embodiment, if the duplication control information supplied from the WM decoder 23 indicates "Never copy" or "No more copy," the controller 100 forms a control signal that disables the duplication of the compressed image signal and supplies this control signal to the write controller 24. Then, the write controller 24 disables the duplication of the compressed digital image signal supplied from the decryption block 22 into the memory 25.

If the duplication control information from the WM decoder 23 indicates "Copy free" or "Copy once," the controller 100 forms a control signal that permits the duplication of the compressed digital image signal and supplies this permission signal to the write controller 24. Then, the write controller 24 duplicates the digital image signal from the decryption block 22 into the memory 25.

When duplicating the digital image signal superimposed with the "Copy once" duplication control information, the duplication control information superimposed on the image signal is overwritten by the information indicating "No more copy." This overwrite operation is executed in or before the write controller 24 for example.

The recording/reproducing device 20 also has a reproduction capability of reproducing a image signal duplicated into the memory 25. When the user instructs, through the keyboard for example connected to the key interface 104, the reproduction of a image signal stored in the memory 25, the controller 100 supplies a control signal to the read controller 26 for reading the specified image signal from the memory 25.

On the basis of the control signal given from the controller 100, the read controller 26 reads the compressed image signal from the memory 25 and supplies the image signal to the video data decoder 27. The video data decoder 27 decompresses the image signal and supplies the decompressed digital image signal to the D/A converter 28.

The D/A converter 28 converts the decompressed digital image signal into an analog signal and outputs it through the analog image signal output terminal 28a. The analog image signal outputted from the output terminal 28a is supplied to the monitor receiver, not shown, to be reproduced to become available for the user.

It will be apparent to those skilled in the art that, at reproduction of a digital image signal stored in the memory 25, a pseudo synchronous pulse for automatic gain control (AGC) may be inserted in the analog image signal to be outputted or the inversion burst for color stripe may be executed on the analog image signal on the basis of the duplication control signal and APS information superimposed as electronic watermark information onto the digital image signal to be reproduced.

In this case, the duplication control signal and the APS information as electronic watermark information are extracted beforehand from the digital image signal to be reproduced. Alternatively, the duplication control information and the APS information to be extracted at duplication are related to the digital image signal duplicated into the memory 25 and these related duplication control information and APS information are stored beforehand in the memory 25. Then, the recording/reproducing device 20 may perform, by use of the extracted or stored information, the control operations of inserting the pseudo synchronous pulse for AGC and executing the inversion burst for color stripe.

Thus, the recording/reproducing device 20 receives an image signal superimposed with the three kinds of additional information, namely duplication control information, APS information, and additional data, forming electronic watermark information, these three kinds of additional information being rotated in sequence for each frame of an image signal and superimposed on the different partial areas of each frame. At the same time, this image signal is inverted in the phases of the these three kinds of additional information on a three-frame basis forming one interval of the rotation of the sequence of these pieces of additional information. Then, the recording/reproducing device 20 correctly and quickly detects each of these three kinds of additional information superimposed on image signals.

The rotation of the sequence of the three kinds of additional information to be superimposed on an image signal makes it quite difficult for users to detect and determine their contents in an unauthorized manner during the transmission of the image signal. Consequently, the additional information as well as the image signal on which it is superimposed can be surely transmitted to their destination, in this example, the recording/reproducing device 20. Then, the recording/reproducing device 20 can correctly extract the additional information according to the sequential rotation for use by the user.

In addition, the phase inversion of each piece of additional information forming electronic watermark information for every period of this above-mentioned sequential rotation can efficiently cancel the image signal component at detection of the additional information, leading to the accurate and quick extraction of the additional information.

Second Embodiment
[Image Signal Output Device]

Figure 8:
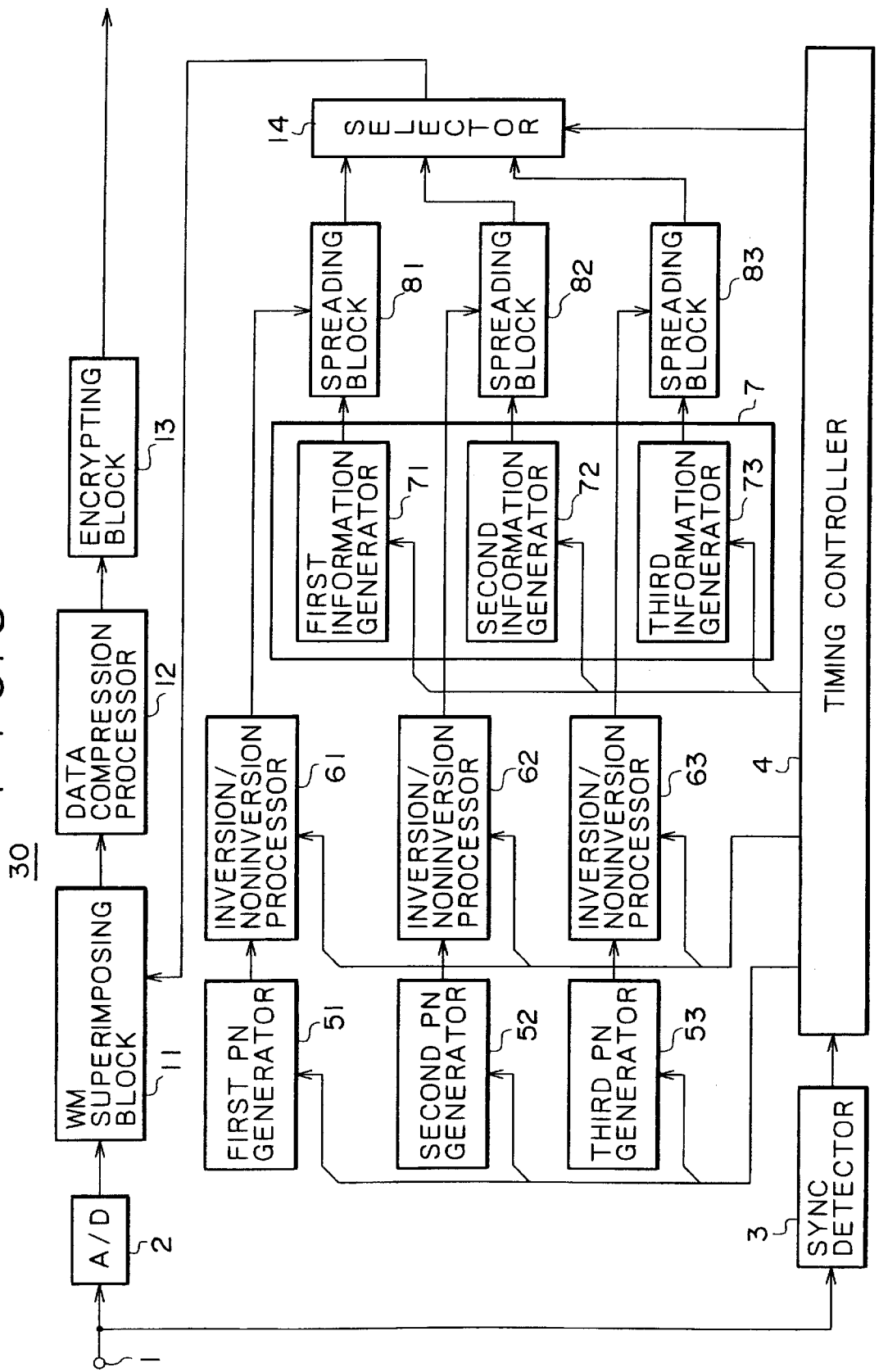
FIG. 8 is a block diagram illustrating an output device of a second embodiment to which the invention is applied.

Referring to FIG. 8, there is shown a block diagram of an image signal output device (hereafter simply referred to as an output device) 30 practiced as a second embodiment of the invention for use in an authoring system, a broadcasting system, and a personal computer for example as with the output device 10 of the first embodiment.

Like the output device 10, the output device 30 superimposes three kinds of additional information, namely duplication control information, APS information, and additional data, onto discrete partial areas AR1, AR2, and AR3 of each of the frames constituting an image signal, as described with reference to FIGS. 2A and 2B.

Namely, the output device 30 is exactly the same as the output device 10 in the superimposition of the additional information onto image signals. A difference lies in that the output device 10 spectrum-spreads the three kinds of additional information by one series of PN codes while the output device 30 spectrum-spreads each of the three kinds of additional information, namely duplication control information, APS information, and additional data by a different series of PN codes.

Therefore, as shown in FIG. 8, the output device 30 has a first PN generator 51, an inversion/noninversion processor 61, and a spreading block 81 in correspondence with a first information generator 71; a second PN generator 52, an inversion/noninversion processor 62, and a spreading block 82 in correspondence with a second PN generator 72; and a third PN generator 53, an inversion/noninversion processor 63, and a spreading block 83 in correspondence with a third information generator 73.

The first PN generator 51, the second PN generator 52, and the third PN generator 53 each generate a different series of PN codes. The inversion/noninversion processors 61, 62, and 63 each is constituted in the same manner as the inversion/noninversion processor 6 of the output device 10. Likewise, the spreading blocks 81, 82, and 83 are each constituted in the same manner as the spreading block 9 of the output device 10.

Further, the output device 30 has a selector switch 14 for switching between the spectrum-spread additional information, as electronic watermark information, that is, APS information, and additional data to be superimposed on an image signal as electronic watermark information.

In the output device 30 of the second embodiment, a timing controller 4, as with the timing controller 4 of the output device 10, generates various timing signals by use of a vertical synchronous signal V and a horizontal synchronous signal H as reference. However, these timing controllers generate different timing signals.

The other components of the output device 30 are the same in constitution with the corresponding components of the output device 10. Therefore, with reference to FIG. 8, in the output device 30 the components similar to those previously described with reference to FIG. 1 are denoted by the same reference numerals and the detail descriptions of these components will be skipped.

In the output device 30, the timing controller 4 generates a reset signal RE for generating a PN code series, a duplication control information series, APS information series, and an additional data series from their beginnings in the partial areas AR1, AR2, and AR3, one to one, of each frame of an image signal shown in FIGS. 2A and 2B and a clock signal CLK for generating each of these series chip by chip.

In the second embodiment, the reset signal RE is a signal having a period equivalent to plural horizontal lines constituting the partial areas AR1, AR2, and AR3 in each frame of an image signal. The clock signal CLK is a signal of one pixel period for generating one chip of each of PN code, duplication control information, APS information, and additional data for each pixel of an image signal for example.

The reset signal RE and the clock signal CLK generated by the timing controller 4 are supplied to the first PN generator 51, the second PN generator 52, and the third PN generator 53, and the first information generator 71, the second information generator 72, and the third information generator 73.

In addition, the timing controller 4 generates an inversion control signal HT for controlling the inversion of the phase of a PN code and supplies the HT signal to the inversion/noninversion processors 61, 62, and 63. This inversion control signal HT has a period for three consecutive frames. Namely, as with the output device 10 of the first embodiment, in the output device 30 of the second embodiment, the inversion control signal HT has a 3-frame period to invert the phase of the additional information to be superimposed on an image signal as electronic watermark information for every rotation of the sequence in which the three kinds of additional information are arranged, namely in units of three frames.

Furthermore, the timing controller 4 generates a switching control signal CT for switching between the three kinds of additional information to be superimposed on an image signals as electronic watermark information and supplies this signal to a selector switch 14. Like the reset signal RE, the switching control signal CT has a period equivalent to plural horizontal lines constituting the partial areas AR1, AR2, and AR3.

The PN generators 51, 52, and 53 generate different series of PN codes having different patterns in the partial areas AR1, AR2, and AR3 of each frame of image signals from their beginnings as shown in FIG. 2A in accordance with the reset signal RE and the clock signal CLK.

The PN code series generated by the PN generators 51, 52, and 53 are supplied correspondingly to the inversion/noninversion processors 61, 62, and 63. On the basis of the inversion control signal HT, each of the inversion/noninversion processors inverts the phase of the supplied PN code series for an inverted interval in which the phase of the additional information is inverted and outputs the supplied PN code series without change for a noninverted interval in which the phase of the additional information need not be inverted. The PN code series outputted from the inversion/noninversion processors 61, 62, and 63 are supplied to the corresponding spreading blocks 81, 82, and 83.

On the other hand, on the basis of the reset signal RE and the clock signal CLK supplied from the timing controller 4, the first information generator 71, the second information generator 72, and the third information generator 73 in an additional information generator 7 generate a duplication control information series, an APS information series, and an additional data series in the partial areas AR1, AR2, and AR3, one to one, of each frame of the image signal and supplies the generated series to the selector switch 14.

In the output device 30 of the second embodiment, like the output device 10, the information generators 71, 72, and 73 in the additional information generator 7 are instructed beforehand by the user through a key operation block and a key controller for example, not shown, what kind of duplication control information, APS information, and additional data are to be generated.

In the output device 30 of the second embodiment, like the output device 10, the first information generator 71 generates, according to the instructed duplication control information, a duplication control information series such that the same duplication control information is assigned to a same sub block and supplies the generated duplication control information series to the spreading block 81.

Likewise, the second information generator 72 generates, according to the instructed APS information, an APS information series such that the same APS information is assigned to a same sub block and supplies the generated APS information series to the spreading block 82. The third information generator 73 generates, according to the instructed additional data, an additional data series such that the same additional data are assigned to a same sub block and supplies the generated additional data series to the spreading block 83.

The spreading block 81 spectrum-spreads the duplication control information series supplied from the first information generator 71 by use of the PN code series supplied from the inversion/noninversion processor 61 and supplies the spread duplication control information to the selector switch 14 as electronic watermark information. Likewise, the spreading block 82 spectrum-spreads the APS information series supplied from the second information generator 72 by use of the PN code series supplied from the inversion/noninversion processor 62 and supplies the spread APS information to the selector switch 14 as electronic watermark information. The spreading block 83 spectrum-spreads the additional data series supplied from the third information generator 73 by use of the PN code series supplied from the inversion/noninversion processor 63 and supplies the spread additional data to the selector switch 14 as electronic watermark information.

Thus, in the output device 30, electronic watermark information, that is, the duplication control information, the APS information, and the additional data obtained by spreading by different PN code series are supplied to the selector switch 14.

On the basis of the switching control signal CT supplied from the timing controller 4, the selector switch selectively supplies the duplication control information supplied from the spreading block 81, the APS information supplied from the spreading block 82, and the additional data supplied from the spreading block 83 to a WM superimposing block 11 for superimposition on the image signal.

In the output device 30 of the second embodiment, like the output device 10, the sequence of the three kinds of additional information is rotated for superimposition on the partial areas AR1, AR2, and AR3 of each frame of the image signal. For this purpose, the selector switch 14 operates, on the basis of the switching control signal CT, such that (1) the duplication control information, (2) the APS information, and (3) the additional data are superimposed in this order onto the partial areas AR1, AR2, and AR3 in this order of the first frame from which the superimposition starts.

For the second frame, the selector switch 14 operates, on the basis of the switching control signal CT, such that (1) the APS information, (2) the additional data, and (3) the duplication control information are superimposed in this order the partial areas AR1, AR2, and AR3 in this order. Thus, the selector switch 14 operates such that the sequence of the three kinds of additional information is rotated for superimposition on the partial areas AR1, AR2, and AR3 of each frame of the image signal. The resultant additional information is then supplied to the WM superimposing block 11 as electronic watermark information for superimposition on the image signal.

Thus, like the output device 10 described with reference to FIG. 2B, the output device 30 rotates the sequence of the duplication control information, the APS information, and the additional data, constituting electronic watermark information, for each interval of three consecutive frames and inverts the phases of these pieces of additional information on a three-frame basis, namely in units of three frames, for superimposition on the image signal.

The digital image signal thus superimposed with the additional information is compressed in MPEG format by a data compression processor 12. The compressed signal is then encrypted by an encryption block 13.

As described, the output device 30 spectrum-spreads the duplication control information, the APS information, and the additional data by different PN code series for superimposition on an image signal. Hence, as will be described, the detection of each of these three kinds of additional information requires the use of three different PN code series by which three kinds of additional information are spectrum-spread, thereby enhancing the secrecy of the additional information superimposed on image signals.

This eventually leads to the enhanced reliability and security of the entire system for processing the image signals on which the additional information is superimposed as electronic watermark information.

[Image Signal Recording/Reproducing Device]

The following describes an image signal recording/reproducing device (hereafter simply referred to as a recording/reproducing device) 20 of the second embodiment adapted to receive an image signal from the output device 30 of the second embodiment shown in FIG. 8 through a network such the Internet for example and duplicate the received image signal. Like the recording/reproducing device 20 of the first embodiment as shown in FIG. 5, the recording/reproducing device 20 of the second embodiment is a personal computer for example.

The recording/reproducing device 20 of the second embodiment is generally the same in constitution as that of the first embodiment as shown in FIG. 5. Therefore, the following description will be made as such.

The output device 30 of the second embodiment is the same as the output device 10 of the first embodiment in that the three kinds of additional information, namely electronic watermark information, are rotated in their sequence to be superimposed on the different superimposition areas of each frame and the phases of these pieces of additional information are inverted for a set of three frames equivalent to one period of the rotation to be superimposed on an image signal.

As described, in the output device 10, the duplication control information, the APS information, and the additional data are all spectrum-spread by a same PN code series to provide electronic watermark information. However, in the output device 30, these three pieces of information are each spectrum-spread by a different PN code series. Hence, the recording/reproducing device 20 of the second embodiment and that of the first embodiment are different in the constitution of the WM decoder 23.

Figure 9:
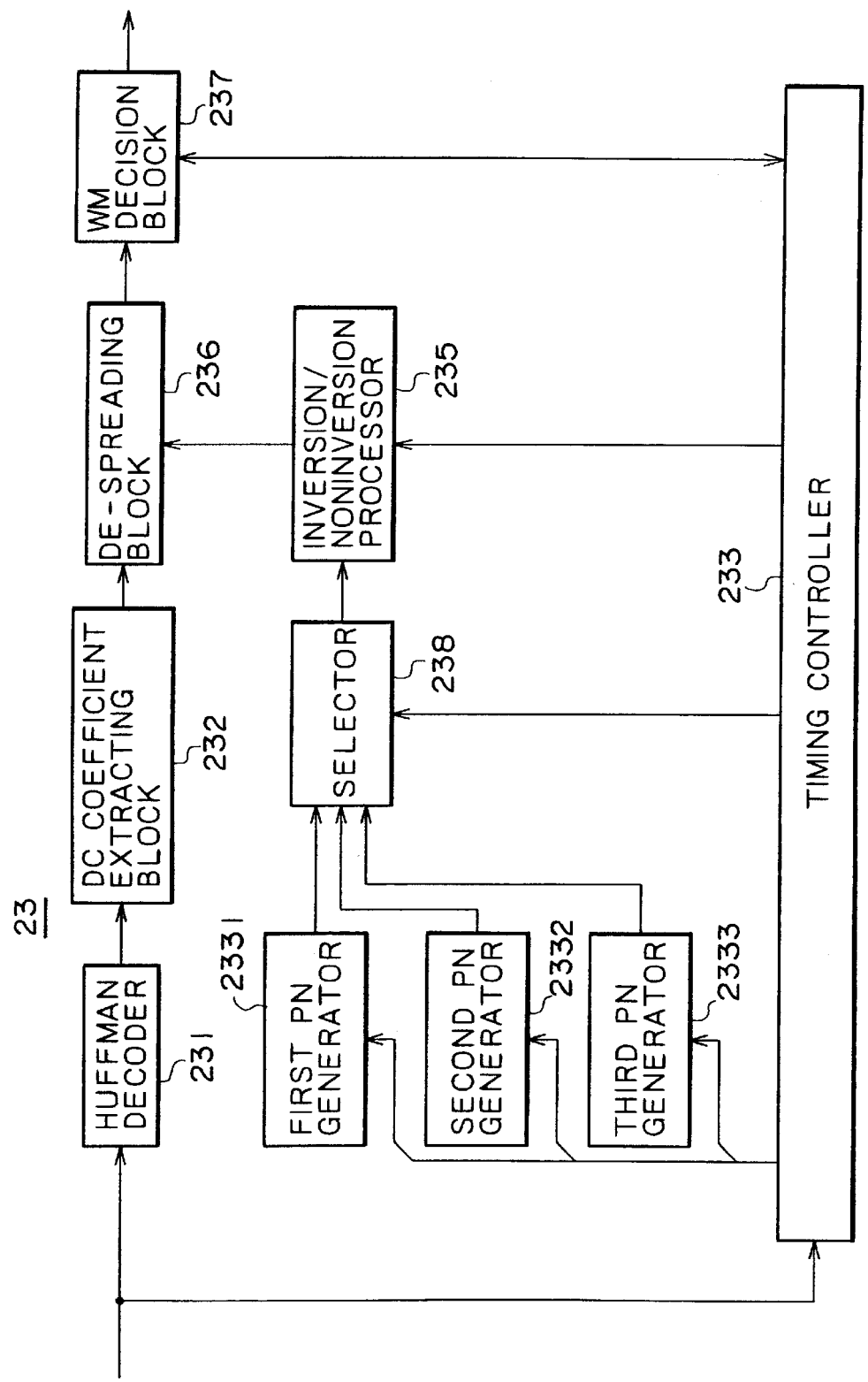
FIG. 9 is a block diagram illustrating an electronic watermark information decoder for detecting additional information superimposed as electronic watermark information on an image signal outputted from the output device shown in FIG. 8.

Referring to FIG. 9, there is shown a block diagram of the WM decoder 23 of the recording/reproducing device 20 of the second embodiment. As shown, the WM decoder 23 of the recording/reproducing device 20 of the second embodiment comprises a first PN generator 2332, a second PN generator 2332, a third PN generator 2333, and a selector switch 238.

As will be described, a timing controller 233 of the WM decoder 23 of the second embodiment generates various timing signals by use of a vertical synchronous signal V and a horizontal synchronous signal H as with the WM decoder 23 of the first embodiment shown in FIG. 6. However, there is a difference between these two WM decoders 23 and 233 in the timing signals to be generated.

The other portions of the WM decoder 23 of the second embodiment are the same as those of the first embodiment. Therefore, with reference to FIG. 9, the components similar to those previously described with reference to FIG. 6 are denoted by the same reference numerals and their detail descriptions will be omitted.

In the recording/reproducing device 20 of the second embodiment, the timing controller 233 of the WM decoder 23 generates, on the basis of the digital image signal supplied from the decryption block 22, timing signals and supplies them to the other components of the WM decoder 23.

To be more specific, the timing controller 233 generates a reset signal RE for generating different PN code series from their beginnings for the partial areas AR1, AR2, and AR3, one to one, shown in FIGS. 2A and 2B of each frame of an image signal and a clock signal CLK for generating these different PN code series chip by chip. These signals are then supplied to the PN generators 2331, 2332, and 2333.

In the recording/reproducing device 20 of the second embodiment, the additional information superimposed as electronic watermark information onto a data-compressed digital image signal is extracted therefrom. Therefore, the reset signal RE is a signal having a period equivalent to plural blocks constituting the partial areas AR1, AR2, and AR3 in each frame of the image signal. The clock signal CL generates one chip of PN code for each sub block (or a DCT block) of the digital image signal.

In addition, the timing controller 233 generates a switching control signal CT for controlling the selector switch 238 to switch between the PN code series for use in de-spreading and supplies this signal to the selector switch 238.

Furthermore, the timing controller 233 generates an inversion control signal HT for controlling an inversion/noninversion processor 235 that inverts the phase of a PN code and supplies the HT signal to the inversion/noninversion processor 235. This inversion control signal HT has a period of one rotation of the sequence of the three kinds of additional information, namely a period equivalent to three consecutive frames.

The first PN generator 2331 generates the same PN code series as that generated by the first PN generator 51 of the output device 30 of the second embodiment. The second PN generator 2332 generates the same PN code series as that generated by the second PN generator 52 of the output device 30. The third PN generator 2333 generates the same PN code series as that generated by the PN generator 53 of the output device 30.

On the basis of the reset signal RE and the clock signal CLK supplied from the timing controller 233, the PN generators 2331, 2332, and 2333 generate different PN code series for the partial areas AR1, AR2, and AR3 of each frame by assigning one chip to each sub block as shown in FIG. 2A and supplies the generated PN code series to the selector switch 238.

On the basis of the switching control signal CT supplied from the timing controller 233, the selector switch 238 switches between the PN code series supplied from the PN generators 2331, 2332, and 2333 to be outputted. The PN code series selected by the selector switch 238 is supplied to the inversion/noninversion processor 235.

On the basis of the inversion control signal HT supplied from the timing controller 233, the inversion/noninversion processor 235 inverts the phases of the PN codes supplied from the selector switch 238 on a three-frame basis. Namely, the inversion/noninversion processor 235 executes the PN-code phase inversion such that the PN codes are outputted without phase inversion for the first three frames, with phase inversion for the second three frames, and without phase inversion for the third three frames. The PN codes supplied from the inversion/noninversion processor 235 are supplied to a de-spreading block 236.

By use of the PN code series supplied from the inversion/noninversion processor 235, the de-spreading block 236 de-spreads the image signal (namely returns the image signal to its initial form) to extract the additional information superimposed thereto as electronic watermark information.

In the WM decoder 23 of the second embodiment, at the beginning of the detection of the additional information superimposed on the image signal as electronic watermark information, de-spreading is executed by use of the PN code series without inverting its phase.

Next, the result of the de-spreading is sent to the timing controller 233 through a WM decision block 237 for example. On the basis of the de-spreading result, the timing controller 233 newly generates the switching control signal CT and the inversion control signal HT such that the rotational period of the duplication control information, the APS information, and the additional data superimposed on the image signal as electronic watermark information and the interval of the inversion/noninversion of the phases of the PN code series for use in spectrum-spreading match the additional information superimposed on the image signal as electronic watermark information.

Namely, in the recording/reproducing device 20 of the second embodiment, each of the duplication control information, the APS information, and the additional data is spectrum-spread by a different PN code series. Therefore, execution of de-spreading by use of the PN code series used in spectrum-spreading the duplication control information for example can detect which of the frame partial areas AR1, AR2, and AR3 the duplication control information is superimposed on.

According to the detection result, the switching control signal and the inversion control signal are newly generated to quickly match the rotational period of the duplication control information, the APS information, and the-additional data superimposed on the image signal as electronic watermark information and the interval of the inversion/noninversion of the phases of the PN code series for use in spectrum-spreading with the additional information superimposed on the image signal as electronic watermark information. Consequently, each of the duplication control information, the APS information, and the additional data can be quickly and correctly extracted from the image signal on which they are superimposed as electronic watermark information.

Thus, the recording/reproducing device 20 of the second embodiment can quickly and correctly extract the three kinds of additional information; duplication control information, the APS information, and the additional data superimposed on the image signal by spectrum-spreading them with different PN code series.

[Modifications to the First and Second Embodiments]

As described with reference to FIGS. 2A and 2B, in the first and second embodiments, the duplication control information, the APS information, and the additional data constituting electronic watermark information are superimposed onto the partial areas AR1, AR2, and AR3 obtained by equally dividing each frame of an image signal by three in the horizontal direction. It will be obvious to those skilled in the art that the superimposition scheme is not limited to this.

Figure 10A:
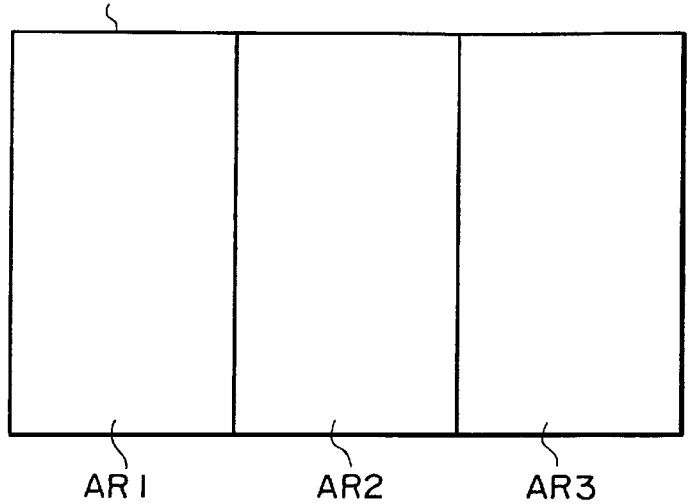
FIG. 10A depicts an additional information superimposition area of an image signal in the output device shown in FIG. 8.
Figure 10B:
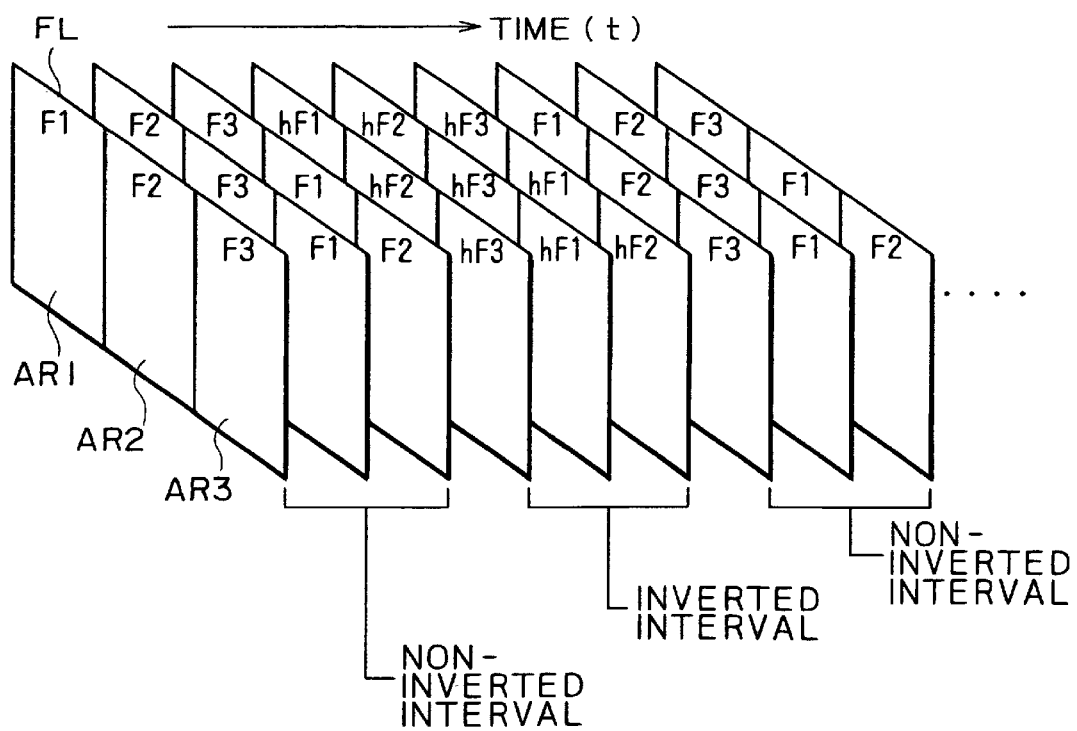
FIG. 10B depicts how the additional information to be superimposed on the additional information superimposition area of an image signal is rotated and phase-inverted in the output device shown in FIG. 8.

Referring to FIGS. 10A and 10B, there is shown an example of another superimposition scheme. In this example, the three kinds of additional information; duplication control information, the APS information, and the additional data are superimposed as electronic watermark information onto three partial areas AR1, AR2, and AR3 which are obtained by equally dividing each frame of an image signal by three in the vertical direction as shown in FIG. 10A.

Let duplication control information be F1, APS information be F2, and additional data be F3. Then, as shown in FIG. 10B, F1, F2, and F3 are superimposed on AR1, AR2, and AR3, one to one, in the first frame. In the second and third frames, the sequence of F1, F2, and F3 is rotated for superimposition. In addition, the phases of the three kinds of additional information as electronic watermark information are inverted for a set of three frames which constitutes one period of the rotation.

FIG. 10B shows that hF1, hF2, and hF3 denote the phase-inverted duplication control information F1, APS information F2, and additional data F3 respectively. Namely, letter "h" denotes the phase inversion.

Thus, the additional information can be superimposed on the three equally and vertically divided areas of each frame. To support this superimposition, the output device 10 and the output device 30 may only generate the timing signals in the timing controller 4 according to the partial areas shown in FIGS. 10A and 10B, requiring no additional hardware on the output devices.

A device for detecting the additional information superimposed as shown in FIG. 10B may also be constituted in the same manner as those of the recording/reproducing devices of the first and second embodiments. In this case, the timing signals may only be generated by the timing controller 233 of the WM decoder 23 according to the partial areas shown in FIGS. 10A and 10B, requiring no additional hardware on the recording/reproducing devices.

Third Embodiment

In the first and second embodiments, the phase of the three kinds of additional information to be superimposed on an image signal as electronic watermark information are inverted on a three-frame basis, namely in units of three frames, in synchronization with the rotation of the sequence in which these three kinds of additional information are arranged. As described, this phase inversion is executed to efficiently cancel the image signal component hindering the quick and correct detection of the additional information.

However, the image signal component can be canceled at the detection of the additional information superimposed on an image signal as electronic watermark information for the efficient detection of the additional information without periodically inverting the phases of the three kinds of additional information to be superimposed.

Figure 11:
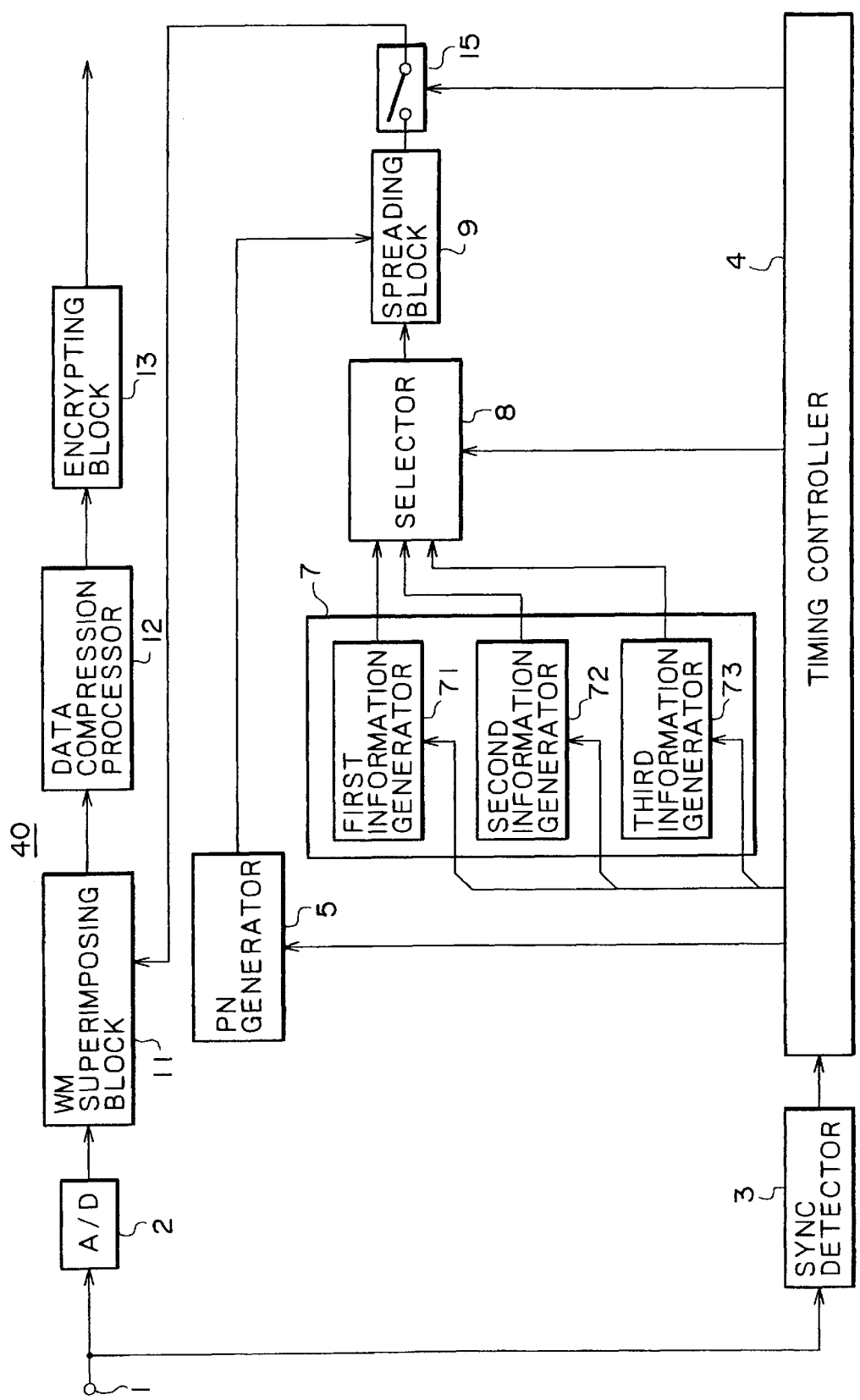
FIG. 11 is a block diagram illustrating an output device of a third embodiment to which the invention is applied.
Figure 12A:
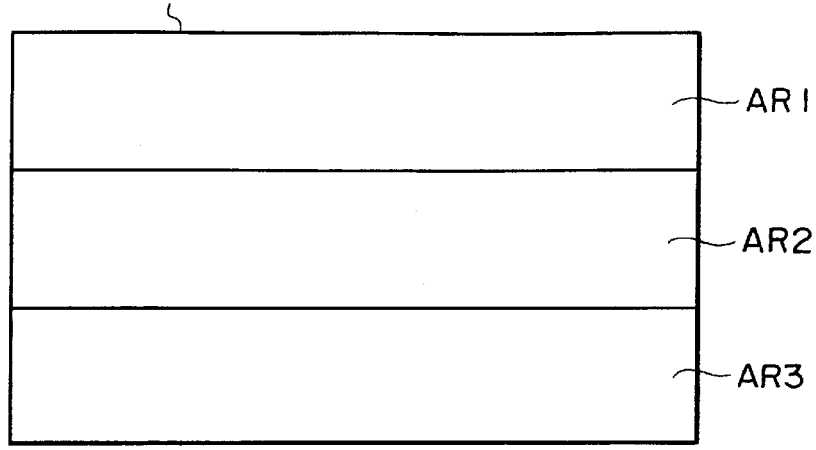
FIG. 12A depicts an additional information superimposition area of an image signal in the output device shown in FIG. 11.
Figure 12B:
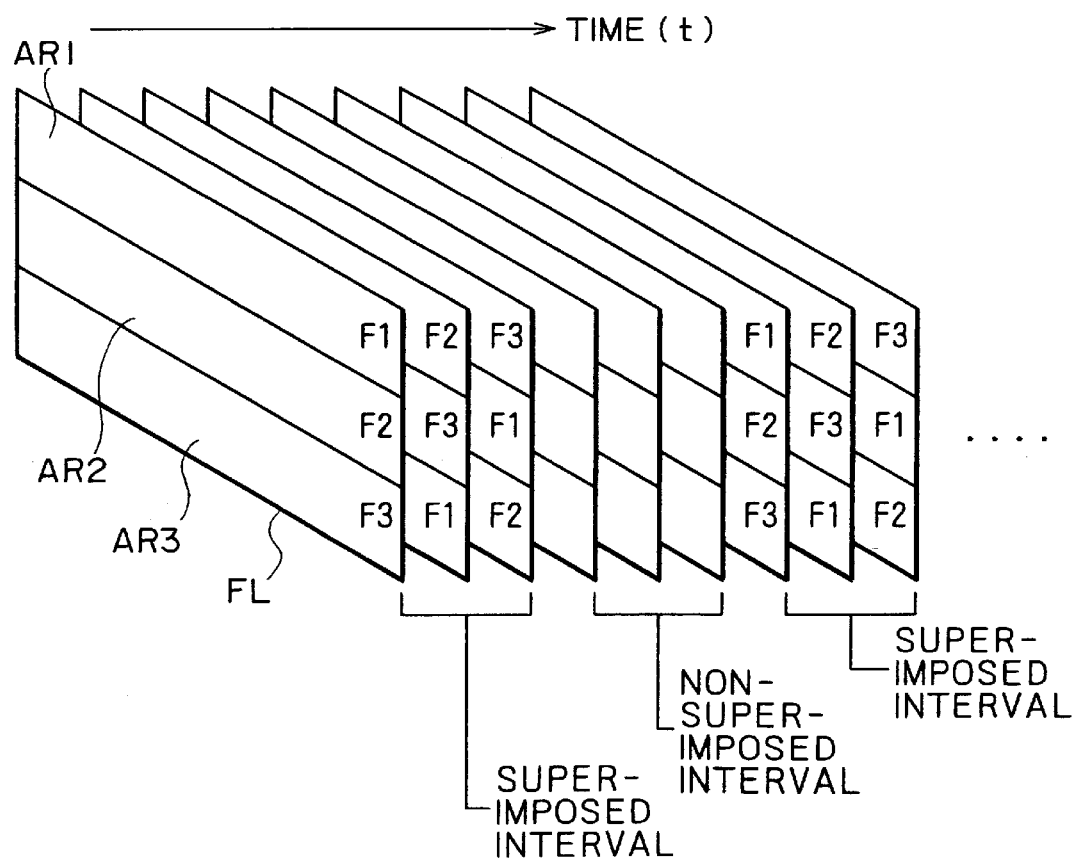
FIG. 12B depicts how the additional information to be superimposed on the additional information superimposition area of the image signal is rotated and phase-inverted in the output device shown in FIG. 11.

Referring to FIG. 11, there is shown a block diagram of an output device 40 of the third embodiment of the invention. FIGS. 12A and 12B illustrate the superimposition of the additional information on an image signal as plural pieces of electronic watermark information by the output device 40.

Like the output device 10 of the first embodiment, the output device 40 of the third embodiment forms electronic watermark information by spectrum-spreading duplication control information, APS information, and additional data using a same PN code series.

Then, the each piece of additional information providing electronic watermark information is superimposed on each frame of an image signal. At this time, the sequence of the three kinds of additional information is rotated for superimposition on the partial areas for each frame.

For this purpose, like the output device 10 of the first embodiment, the output device 40 of the third embodiment equally divides each frame FL of the image signal by three in the horizontal direction to form partial areas AR1, AR2, and AR3. The three kinds of additional information; duplication control information, the APS information, and the additional data as electronic watermark information are superimposed on these partial areas one to one.

However, in the case of the output device 40, the additional information is superimposed for every other set of three consecutive frames as shown in FIG. 12B. That is, a set of three frames on which the additional information is superimposed and another set of three frames on which no additional information is superimposed alternate.

This arrangement allows the cancellation of the image signal component and the efficient extraction of the additional information from the image signals by subtracting the image signal in an interval in which no additional information is superimposed on three frames from the image signal in the preceding interval in which the additional information is superimposed on three frames.

To carry out this subtraction, the output device 40 has a switch circuit 15 as shown in FIG. 11 instead of the inversion/noninversion processor 6 of the output device 10 of the first embodiment as shown in FIG. 1. This switch circuit 15 controls the superimposition of the additional information as electronic watermark information.

The other portions of the output device 40 are the same as those of the output device 10 of the first embodiment. In the output device 10 of the first embodiment, the inversion control signal HT is supplied to the inversion/noninversion processor 6 to invert the phase of the PN code series for use in spectrum spreading in units of three frames as shown in FIG. 1. In the output device 40 of the third embodiment, however, the inversion control signal HT is supplied to the switch circuit 15 as a superimposition/nonsuperimposition control signal.

Consequently, as shown in FIG. 12B, the duplication control information, the APS information, and the additional data are superimposed on the image signal as electronic watermark information in the first set of three frames, not superimposed in the second set of three frames, superimposed again in the third set of three frames, and so on. In each superimposed interval, the sequence of the three kinds of additional information are rotated every frame for superimposition on its partial areas AR1, AR2, and AR3.

A detecting device which receives the image signal from the output device 40 to detect the additional information from the received image signal may be constituted in generally the same manner as the WM decoder 23 of the recording/reproducing device 20 of the first embodiment as shown in FIG. 6.

Namely, in the WM decoder 23 shown in FIG. 6, the phase of each PN code is inverted in units of three frames. Therefore, matching an additional information superimposed interval with a PN code noninverted interval and matching an additional information nonsuperimposed interval with a PN code inverted interval invert the phase of the image signal component in the nonsuperimposed interval by multiplication with the phase-inverted PN code, thereby making the image signal component in the nonsuperimposed interval and the image signal component in the superimposed interval cancel each other.

Fourth Embodiment

Duplication control information, APS information, and additional data may be spectrum-spread each by a different PN code series to be superimposed in the manner shown in FIG. 12B; namely a set of three frames on which the additional information is superimposed and a set of three frames on which no additional information is superimposed alternately.

Figure 13:
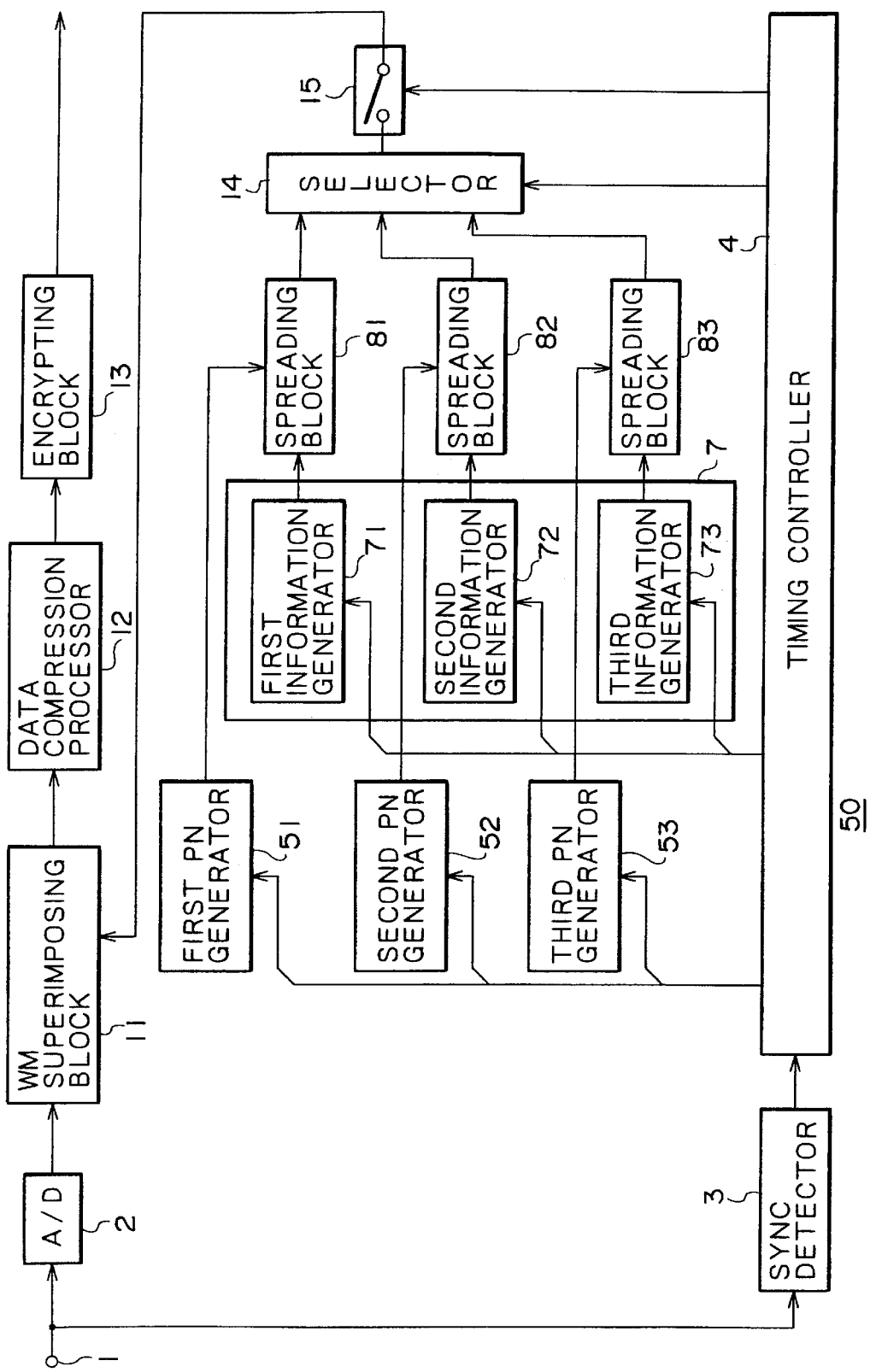
FIG. 13 is a block diagram illustrating an output device of a fourth embodiment to which the invention is applied.

Referring to FIG. 13, there is shown a block diagram of an output device 50 of the fourth embodiment of the invention. Like the output device 30 of the second embodiment, the output device 50 forms electronic watermark information by spectrum-spreading three kinds of additional information, namely duplication control information, APS information, and additional data, each by a different PN code series.

These pieces of additional information thus formed are superimposed on each frame of an image signal. In doing so, the sequence in which these three pieces of additional information are arranged is rotated in units of three frames so that they are superimposed each on a different partial area of each frame every time the superimposition is executed. In this case, as described with reference to FIG. 12B, the additional information is superimposed such that a set of three frames on which the additional information is superimposed and a set of three frames on which no additional information is superimposed alternately.

For this purpose, the output device 50 of the fourth embodiment has a switch circuit 15 as shown in FIG. 11 for controlling the superimposition of the additional information as electronic watermark information instead of the inversion/noninversion processors 61, 62, and 63 of the output device 30 of the second embodiment shown in FIG. 8.

The other portions are constituted in generally the same manner as those the output device 30 of the second embodiment shown in FIG. 8. In the output device 30 of the second embodiment, the inversion control signal HT is supplied to the inversion/noninversion processors 61, 62, and 63 to invert the phase of the PN code series for use in spectrum spreading on a three-frame basis. In the output device 50, however, the inversion control signal HT is supplied to the switch circuit 15 as a superimposition/nonsuperimposition control signal.

Consequently, as shown in FIG. 12B, the duplication control information, the APS information, and the additional data each spectrum-spread by a different PN code series to provide electronic watermark information are superimposed on an image signal for a set of three frames followed by a set of three nonsuperimposed frames, which is followed by another set of three superimposed frames, and so on. In each set of superimposed frames, the sequence of the three kinds of additional information is rotated so that they are superimposed each on a different partial area in each frame.

A detecting device for receiving the image signal from the output device 50 may be constituted in generally the same manner as the WM decoder 23 of the recording/reproducing device 20 of the second embodiment.

In this case, again, the phase of the image signal component in the nonsuperimposed interval is inverted by multiplication with the phase-inverted PN code, thereby making the image signal component in the nonsuperimposed interval and the image signal component in the superimposed interval cancel each other.

The above-mentioned embodiments have been described by use of examples in which duplication control information, APS information, and additional data are superimposed on image signals as electronic watermark information. However, the invention is not limited to these examples. Other various kinds of additional information may be superimposed in the same manner.

For example, multiple-bit additional information is divided into predetermined units of bits. Each of the resultant pieces of information is regarded as one piece of additional information. The sequence of these pieces of additional information is rotated for superimposition on an image signal. At the same time, the image signal may have intervals in which the phases of these pieces of additional information are inverted. In addition, the image signal may have intervals in which these pieces of additional information are superimposed and not superimposed alternately. This arrangement enhances the secrecy of the multiple-bit additional information and superimposes it on image signals for its efficient detection.

It will be apparent to those skilled in the art that the sequence of the three kinds of additional information may be rotated in other manners than mentioned above in which the rotation is made in the forward direction. For example, the rotation may be made in various predetermined orders.

It will be also apparent to those skilled in the art that the size of the partial areas on which the additional information is superimposed and the period of the rotation of the additional information may be other than those described above. For example, they may be set depending on the number of pieces of additional information to be superimposed and the number of bits constituting each piece of the additional information.

To be more specific, when detecting the superimposed additional information from a data-compressed digital image signal (or a bit stream), the rotation period of particular patterns may be determined according to the period of a coded screen based on the information closed only in screen, namely 15 frames of an image data group called a GOP (Group Of Picture) that includes one I (Intra) picture in MPEG-based data compression.

For example, the rotation period of plural particular patterns is set to three frames, five frames, and fifteen frames relative to the I picture and the I picture is detected from the data-compressed image signal. On the basis of the detected I picture, plural pieces of electronic watermark information are quickly and correctly detected from the image signal. Thus, the additional information may be superimposed as particular patterns.

Because the I picture is a coded screen based on the information closed in that frame and includes all the information about the frame, use of the I picture as reference allows the correct detection of the plural particular patterns superimposed on an image signal. Thus, the additional information can be superimposed as particular patterns to facilitate its detection from the image signal.

In the above-mentioned embodiments, spectrum-spreading is executed by use of PN codes. It will be apparent to those skilled in the art that various other codes such as Gold codes may be used for spectrum spreading.

In the above-mentioned embodiments, the particular patterns according to the additional information are described as the electronic watermark information formed by spectrum spreading. It will be apparent to those skilled in the art that these patterns may also be formed by other various electronic watermarking techniques. For example, electronic watermark information having a predetermined pattern called a unit water mark may be prepared for each piece of additional information be superimposed on an image signal and this electronic watermark information is superimposed thereon.

In the above-mentioned embodiments, spread codes may be used without change as particular patterns corresponding to the additional information. That is, PN codes of many series are prepared according to the number of pieces of additional information. For example, in the duplication control information, the PN code indicative of "Never copy" is set to the first series, the PN code indicative of "Copy free" is set to the second series, and so on. Then, these PN codes corresponding to the additional information may be superimposed on an image signal.

In this case, de-spreading may be executed by sequential use of the PN codes of expected series to detect which series of a PN code is superimposed. On the basis of the detection, the contents of the additional information superimposed on the image signal may be determined.

Furthermore, spread codes of different types may be superimposed on an image signal according to the additional information. The additional information may be transmitted on the basis of the spread code types. Thus, the invention is applicable to the case in which spread codes themselves are used as particular patterns.

As described, the additional information superimposing method and additional information superimposing apparatus according to the invention are applicable to various image signal output devices such as authoring systems, broadcasting systems, and personal computers.

The additional information detecting method and additional information detecting apparatus according to the invention are applicable to receiving systems such as a set top box and a cable box for receiving broadcast signals, various reproducing systems, various recording systems, various recording/reproducing systems, personal computers, and other kinds of systems capable of receiving and processing information signals such as image signals.

In the above-mentioned embodiments, image signals are used for example. It will be apparent to those skilled in the art that the present invention is also applicable to voice signals, control signals, and data. Namely, each piece of data is processed in a predetermined unit equivalent to a frame of an image signal and a unit for dividing this predetermined unit is set to plural areas on which the additional information is superimposed.

As described and according to the invention, the additional information may be superimposed as particular patterns on image signals with enhanced secrecy and detection performance. At the time of detection, the additional information may be quickly and correctly extracted from the image signals on which it is superimposed.

While the preferred embodiments of the present invention have been described using specific terms, such description is for illustrative purposes only, and it is to be understood that changes and variations may be made without departing from the spirit or scope of the appended claims.

What is claimed is:

1. An additional information superimposing apparatus for superimposing additional information on an information signal, comprising:
   a particular-pattern generating means for generating a plurality of particular patterns corresponding to said additional information;
   a rotating means for rotating, in a predetermined order, a sequence in which said plurality of sequentially particular patterns are arranged and outputting the rotated particular patterns;
   a phase inverting means for inverting the phases of said plurality of particular patterns for every predetermined period and outputting the phase-inverted particular patterns; and a superimposing means for superimposing each of the sequentially rotated and phase-inverted particular patterns onto each of predetermined units of said information signal.

2. The additional information superimposing apparatus according to claim 1, wherein said phase inverting means inverts the phases of said plurality of particular patterns every one period of the rotation of the sequence of said plurality of particular patterns.

3. The additional information superimposing apparatus according to claim 1, wherein said information signal is an image signal and said superimposing means superimposes said plurality of particular patterns one onto each of different partial areas in one screen of said image signal for every frame or field of said image signal.

4. The additional information superimposing apparatus according to claim 1, wherein said particular-pattern generating means generates said plurality of particular patterns corresponding to said additional information by spreading said plurality of particular patterns by use of spread codes of a same series.

5. The additional information superimposing apparatus according to claim 1, wherein said particular-pattern generating means generates said plurality of particular patterns corresponding to said additional information by spreading said plurality of particular patterns by use of spread codes of a different series.

6. The additional information superimposing apparatus according to claim 3, wherein said image signal is compressed data and said rotating means determines a period of the sequential rotation of said plurality of particular patterns according to a period of an image signal group including coded data based on information only in the screen.

7. An additional information superimposing apparatus for superimposing additional information on an information signal, comprising:
   a particular-pattern generating means for generating a plurality of particular patterns corresponding to said additional information;
   a rotating means for rotating, in a predetermined order, a sequence in which said plurality of particular patterns are arranged and outputting the sequentially rotated particular patterns; and
   a superimposing means for superimposing in an intermittent manner the sequentially rotated particular patterns onto said information signal for every predetermined unit.

8. The additional information superimposing apparatus according to claim 7, wherein said superimposing means superimposes each of the sequentially rotated particular patterns onto said information signal in a period of said sequential rotation in an intermittent manner and at a different location of said information signal.

9. The additional information superimposing apparatus according to claim 7, wherein said information signal is an image signal and said superimposing means superimposes said plurality of particular patterns one onto each of different partial areas in one screen of said image signal for every frame or field of said image signal.

10. The additional information superimposing apparatus according to claim 7, wherein said particular-pattern generating means generates said plurality of particular patterns corresponding to said additional information by spreading said plurality of particular patterns by use of spread codes of a same series.

11. The additional information superimposing apparatus according to claim 7, wherein said particular-pattern generating means generates said plurality of particular patterns corresponding to said additional information by spreading said plurality of particular patterns by use of spread codes of a different series.

12. The additional information superimposing apparatus according to claim 9, wherein said image signal is compressed data and said rotating means determines a period of the sequential rotation of said plurality of particular patterns according to a period of an image signal group including coded data based on information only in the screen.

13. An additional information detecting apparatus for detecting additional information from an information signal with a plurality of particular patterns corresponding to said additional information superimposed onto different locations in a predetermined unit in said information signal, said additional information detecting apparatus comprising:
   a detecting means for detecting said plurality of particular patterns corresponding to said additional information from said information signal by superimposing said plurality of particular patterns onto said information signal with their phases inverted for every predetermined period and by making information signal components of the information signals in the adjacent predetermined periods cancel each other; and
   a decision means for determining said additional information from said plurality of particular patterns detected by said detecting means on the basis of a predetermined sequential rotation of said plurality of particular patterns.

14. The additional information detecting apparatus according to claim 13, wherein said detecting means comprising:
   a code series generating means for generating a predetermined code series to be stored in advance;
   a phase inverting means for inverting a phase of said code series in every predetermined period;
   a de-spreading means for de-spreading said information signal by use of the phase-inverted code series outputted from said phase inverting means; and
   a particular-pattern detecting means for making said information signal components of the information signals in the adjacent phase inversion periods by said phase inverting means cancel each other and detecting said plurality of particular patterns from said information signal.

15. The additional information detecting apparatus according to claim 14, wherein each of said plurality of particular pattern is a spread spectrum signal formed by use of a spread code of a same series and said de-spreading means de-spreads said information signal by use of the spread code having a same series as that of said spread code used at the spreading and a same phase as that of each of said plurality of particular patterns.

16. The additional information detecting apparatus according to claim 14, wherein each of said plurality of particular patterns is a spread spectrum signal formed by use of a spread code having a series different from those of the other particular patterns and said de-spreading means de-spreads said information signal by use of the spread code having a same phase as that of each of said plurality of particular patterns and a different series used at the spreading.

17. The additional information detecting apparatus according to claim 13, wherein said information signal has a compressed image signal for which a period of the sequential rotation of said plurality of particular patterns is determined according to a period of an image signal group including coded data based on information only in a screen, and said detecting means detects said image signal group including said coded data to determine said period of the sequential rotation and detects said plurality of particular patterns.

18. An additional information detecting apparatus for detecting additional information from an information signal with a plurality of particular patterns corresponding to said additional information superimposed onto different locations in a predetermined unit in said information signal, said additional information detecting apparatus comprising:

a detecting means for detecting said plurality of particular patterns corresponding to said additional information from said information signal by superimposing said plurality of particular patterns intermittently onto said information signal for every predetermined period and by making information signal components of the information signals in the adjacent predetermined periods cancel each other; and a decision means for determining said additional information from said plurality of particular patterns detected by said detecting means on the basis of a predetermined sequential rotation of said plurality of particular patterns.

19. The additional information detecting apparatus according to claim 18, wherein said detecting means comprising:

a code series generating means for generating a predetermined code series to be stored in advance;

a phase inverting means for inverting a phase of said code series in a non-superimposition interval of said information signal provided by the intermittent superimposition of said additional information;

a de-spreading means for de-spreading said information signal by use of the phase-inverted code series outputted from said phase inverting means; and a particular-pattern detecting means for making said information signal components of the information signals in the adjacent periods of the phase inversion by said phase inverting means cancel each other to detect said plurality of particular patterns from said information signal.

20. The additional information detecting apparatus according to claim 19, wherein each of said plurality of particular patterns is a spread spectrum signal formed by use of a spread code having a same series and said de-spreading means de-spreads said information signal by use of the spread code of a same series as that of said spread code used at the spreading, a phase of said code series in said spread code being inverted in said non-superimposition interval.

21. The additional information detecting apparatus according to claim 19, wherein each of said plurality of particular patterns is a spread spectrum signal formed by use of a spread code having a different series and said de-spreading means de-spreads said information signal by use of the spread code having a different series used at the spectrum spreading, a phase of said code series being inverted in said non-superimposition interval.

22. The additional information detecting apparatus according to claim 18, wherein said information signal has a compressed image signal for which a period of the rotation of the sequence of said plurality of particular patterns is determined according to a period of an image signal group including coded data based on information only in a screen, and said detecting means detects said image signal group including said coded data to determine said period of the sequential rotation and detects said plurality of particular patterns.

23. An additional information superimposing method for superimposing additional information on an information signal, comprising the steps of:

generating a plurality of particular patterns corresponding to said additional information;

rotating, in a predetermined order, a sequence in which said plurality of particular patterns are arranged and outputting the sequentially rotated particular patterns;

inverting the phases of said plurality of particular patterns for every predetermined period and outputting the phase-inverted particular patterns; and superimposing each of the sequentially rotated and phase-inverted particular patterns onto each of predetermined units of said information signal.

24. An additional information superimposing method for superimposing additional information on an information signal, comprising the steps of:

generating a plurality of particular patterns corresponding to said additional information;

rotating, in a predetermined order, a sequence in which said plurality of particular patterns are arranged and outputting the sequentially rotated particular patterns; and superimposing in an intermittent manner the sequentially rotated particular patterns onto said information signal for every predetermined unit.

25. An additional information detecting method for detecting additional information from an information signal with a plurality of particular patterns corresponding to said additional information superimposed onto different locations in a predetermined unit in said information signal, said additional information detecting method comprising the steps of:

detecting said plurality of particular patterns corresponding to said additional information from said information signal by superimposing said plurality of particular patterns onto said information signal with their phases inverted for every predetermined period and by making information signal components of the information signals in the adjacent predetermined periods cancel each other; and determining said additional information from said plurality of particular patterns detected in said detecting step on the basis of a predetermined sequential rotation of said plurality of particular patterns.

26. An additional information detecting method for detecting additional information from an information signal with a plurality of particular patterns corresponding to said additional information superimposed onto different locations in a predetermined unit in said information signal, said additional information detecting method comprising the steps of:

detecting said plurality of particular patterns from corresponding to said additional information said information signal by superimposing said plurality of particular patterns intermittently onto said information signal for every predetermined period and by making information signal components of the information signals in the adjacent predetermined periods cancel each other; and determining said additional information from said plurality of particular patterns detected in said detecting step on the basis of a predetermined sequential rotation of said plurality of particular patterns.

* * * * *